US009109053B2

(12) United States Patent
Tatemoto et al.

(10) Patent No.: US 9,109,053 B2
(45) Date of Patent: Aug. 18, 2015

(54) FLUOROPOLYMER DISPERSION AND PROCESS FOR PRODUCING FLUOROPOLYMER DISPERSION

(71) Applicant: DAIKIN INDUSTRIES, LTD., Osaka, Osaka (JP)

(72) Inventors: Masayoshi Tatemoto, Takasuki (JP); Takuya Arase, Settsu (JP); Tadashi Ino, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 200 days.

(21) Appl. No.: 13/846,661

(22) Filed: Mar. 18, 2013

(65) Prior Publication Data

US 2013/0225764 A1 Aug. 29, 2013

Related U.S. Application Data

(62) Division of application No. 10/518,052, filed as application No. PCT/JP03/07591 on Jun. 16, 2003, now abandoned.

(30) Foreign Application Priority Data

Jun. 17, 2002 (JP) .................................. 2002-175445
Mar. 3, 2003 (JP) .................................. 2003-056185

(51) Int. Cl.
| | | |
|---|---|---|
| C08L 27/12 | (2006.01) | |
| C08F 2/10 | (2006.01) | |
| B01D 67/00 | (2006.01) | |
| B01D 69/10 | (2006.01) | |
| B01D 69/12 | (2006.01) | |
| B01D 69/14 | (2006.01) | |
| B01D 71/32 | (2006.01) | |
| B01D 71/82 | (2006.01) | |
| C08F 6/00 | (2006.01) | |
| C08F 6/14 | (2006.01) | |
| H01M 8/10 | (2006.01) | |

(52) U.S. Cl.
CPC .............. *C08F 2/10* (2013.01); *B01D 67/0009* (2013.01); *B01D 67/0011* (2013.01); *B01D 69/10* (2013.01); *B01D 69/12* (2013.01); *B01D 69/141* (2013.01); *B01D 71/32* (2013.01); *B01D 71/82* (2013.01); *C08F 6/003* (2013.01); *C08F 6/14* (2013.01); *H01M 8/1004* (2013.01); *H01M 8/1025* (2013.01); *H01M 8/1039* (2013.01); *H01M 8/1072* (2013.01); *B01D 2323/06* (2013.01); *B01D 2323/46* (2013.01); *B01D 2325/10* (2013.01); *B01D 2325/14* (2013.01); *B01D 2325/42* (2013.01); *C08F 2800/10* (2013.01); *H01M 2300/0082* (2013.01); *Y02E 60/522* (2013.01); *Y02E 60/523* (2013.01)

(58) Field of Classification Search
CPC .... B01D 67/0009; B01D 69/10; B01D 69/12; B01D 69/141; B01D 71/32; B01D 71/82; B01D 67/0011; H01M 8/1004; H01M 8/1025; H01M 8/1039; H01M 8/1072; C08F 2/10; C08F 6/003; C08F 6/14; C08L 27/12
USPC .......................................................... 524/805
See application file for complete search history.

(56) References Cited

U.S. PATENT DOCUMENTS

| | | | |
|---|---|---|---|
| 3,282,875 A | 11/1966 | Connolly | |
| 3,462,401 A | 8/1969 | Kometani et al. | |
| 3,726,483 A | 4/1973 | Kometani et al. | |
| 3,819,594 A | 6/1974 | Holmes et al. | |
| 4,126,588 A | 11/1978 | Ukihashi et al. | |
| 4,341,685 A * | 7/1982 | Miyake et al. ................ 524/104 |
| 4,433,082 A | 2/1984 | Grot | |
| 4,540,716 A | 9/1985 | Covitch et al. | |

(Continued)

FOREIGN PATENT DOCUMENTS

| | | |
|---|---|---|
| EP | 0222945 A1 | 5/1987 |
| EP | 0226668 A1 | 7/1987 |

(Continued)

OTHER PUBLICATIONS

Supplementary European Search Report on counterpart EP 03792618.5 dated Mar. 26, 2009.
XP-002519259 (for JP 55-029519).
XP-002519260 (for JP 59-196308).
Benoit Loppinet, et al.; Rodlike Colloidal Structure of Short Pendant Chain Perfluorinated Ionomer Solutions; Langmuir; 1998, 14; pp. 1977-1983.

(Continued)

*Primary Examiner* — Alexander Kollias
(74) *Attorney, Agent, or Firm* — Sughrue Mion, PLLC

(57) ABSTRACT

A method for producing a fluoropolymer dispersion where a fine particle containing a fluoropolymer is dispersed in an aqueous dispersion medium, the fluoropolymer having a sulfonic acid group, and the method including a polymerization reaction step of emulsion polymerizing a fluorovinyl ether derivative and a fluorine-containing ethylenic monomer to give a fluoropolymer precursor, a hydrolysis step of hydrolyzing, in an aqueous medium, $-SO_2X^1$, where $X^1$ represents a halogen atom, which the fluoropolymer precursor has thereby to give the fluoropolymer, the fluorovinyl ether derivative being represented by the following general formula (II):

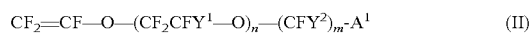

$$CF_2=CF-O-(CF_2CFY^1-O)_n-(CFY^2)_m-A^1 \quad \text{(II)}$$

wherein $Y^1$, $n$, $Y^1$, $m$ and $A^1$ are as defined herein, the fluoropolymer precursor having a fluorovinyl ether derivative unit content of 5 to 40 mole percent, and the fluoropolymer dispersion being produced without drying the fluoropolymer precursor and the fluoropolymer.

10 Claims, No Drawings

(56) References Cited

U.S. PATENT DOCUMENTS

| | | | |
|---|---|---|---|
| 4,935,477 | A | 6/1990 | Squire |
| 5,194,335 | A | 3/1993 | Effenberger et al. |
| 5,576,381 | A * | 11/1996 | Bl adel et al. ............ 524/544 |
| 6,140,408 | A | 10/2000 | McCarthy et al. |
| 6,140,436 | A | 10/2000 | Doyle et al. |
| 6,150,426 | A | 11/2000 | Curtin et al. |
| 6,197,903 | B1 | 3/2001 | Maccone et al. |
| 6,274,677 | B1 * | 8/2001 | Tatemoto ............ 525/276 |
| 2001/0018144 | A1 * | 8/2001 | Watakabe et al. ............ 429/33 |
| 2004/0072977 | A1 | 4/2004 | Kaulbach et al. |
| 2004/0167289 | A1 | 8/2004 | Bekiarian et al. |

FOREIGN PATENT DOCUMENTS

| | | |
|---|---|---|
| EP | 0341716 A2 | 11/1989 |
| EP | 0 779 335 A1 | 6/1997 |
| GB | 1034197 A | 6/1966 |
| JP | 41-7949 | 4/1941 |
| JP | 55-29519 A | 3/1980 |
| JP | 59-196308 A | 11/1984 |
| JP | 8-67795 A | 3/1996 |
| JP | 8-236122 A | 9/1996 |
| JP | 9-161804 A | 6/1997 |
| JP | 11-335346 A | 12/1999 |
| JP | 2000-188111 A | 7/2000 |
| JP | 2001-504872 A | 4/2001 |
| JP | 2001-226425 A | 8/2001 |
| JP | 2001-226436 A | 8/2001 |
| JP | 2002-343380 A | 11/2002 |
| JP | 2004-537612 A | 12/2004 |
| WO | 9816581 A1 | 4/1989 |
| WO | 9717381 A1 | 5/1997 |
| WO | 03007453 A2 | 1/2003 |

OTHER PUBLICATIONS

G. Gebel; Structural evolution of water swollen perfluorosulfonated ionomers from dry membrane to solution; Polymer 41 (2000); pp. 5829-5838.

George Odian, Principles of Polymerization; John Wiley & Sons, Inc.; New York; 1991; pp. 339-341.

STN Search Report; pp. 1-2.

The Merck Index—An Encyclopedia of Chemicals, Drugs, and Biologicals; Twelfth Edition; Edited by Susan Budavari; Merck Research Laboratories; Merck & Co., Inc.; Whitehouse Station, NJ; 1996; pp. 1018-1019.

Extended European Search Report dated Jul. 28, 2011 for corresponding European Patent Application No. 11 16 7442.

* cited by examiner

FLUOROPOLYMER DISPERSION AND PROCESS FOR PRODUCING FLUOROPOLYMER DISPERSION

CROSS-REFERENCE TO RELATED APPLICATIONS

This application is a divisional application of U.S. application Ser. No. 10/518,052 filed Dec. 16, 2004, which is a 371 of PCT International Application No. PCT/JP2003/007591 filed Jun. 16, 2003, which claims benefit of Japanese Patent Application No. 2003-056185 filed Mar. 3, 2003 and Japanese Patent Application No. 2002-175445 filed Jun. 17, 2002. The above-noted applications are incorporated herein by reference to their entirety.

TECHNICAL FIELDS

The present invention relates to a fluoropolymer solid composition, a fluoropolymer dispersion and a method for producing a fluoropolymer dispersion.

BACKGROUND ART

Sulfonic acid group- and/or carboxyl group-containing fluoropolymers were initially developed mainly for the purpose of using them as ion exchange membranes to be utilized in common salt electrolysis, among others. Conventionally, such membrane-like molded articles are produced by molding —$SO_2F$ group-containing fluoropolymers by extrusion molding, for instance, followed by hydrolysis.

Sulfonic acid group- or like acid group-containing fluoropolymers have recently attracted attention as materials of not only ion exchange membranes for common salt electrolysis but also electrolyte membranes for fuel cells and chemical sensors, and so forth.

A solution of a sulfonic acid group-containing fluoropolymer in a mixed solvent comprising an alcohol is known as a medium for immobilizing a catalyst on the electrolyte membrane surface in the manufacture of electrolyte membranes and the like (cf. e.g. Japanese Kokai Publication Hei-08-236122). However, this solution has a problem in that it covers active sites of the catalyst in the process of drying, for instance, and thus cause deteriorations in performance characteristics of fuel cells (cf. e.g. Makoto Uchida: "Element technologies of and design guidelines for gas diffusion electrodes for PEFC", Denkikagaku oyobi Kogyobutsurikagaku (English title: Electrochemistry), published by The Electrochemical Society of Japan, 2002, vol. 70, No. 8, p. 639). This solution has a further problem from the environmental and/or operational viewpoint. Therefore, aqueous dispersions of sulfonic acid group-containing fluoropolymers have been demanded.

Aqueous dispersions of sulfonic acid group-containing fluoropolymers as such can also be used like solutions, hence can adequately be used in film/membrane formation by casting or in immersion, for instance. Thus, they have a wide range of application.

A method currently used in preparing aqueous dispersions of sulfonic acid group-containing fluoropolymers comprises subjecting membranous molded articles made from —$SO_2F$ group-containing fluoropolymer to alkali treatment and then to acid treatment to convert —$SO_2F$ groups to sulfonic acid groups and, further, treating the molded articles in a mixed solvent composed of water and a lower alcohol or in water at high temperature and high pressure conditions.

The —$SO_2F$ group-containing fluoropolymer so far used in the art in preparing membranous molded articles are produced mostly by solution polymerization to obtain pellets for use in extrusion molding and like methods of producing membranous molded articles.

Conceivable as a method of obtaining aqueous fluoropolymer dispersions as an alternative to solution polymerization is emulsion polymerization. Generally, the polymers in polymer latexes prepared by emulsion polymerization are recovered by adding an electrolyte to the latexes to cause coagulation of polymer particles. However, it is a problem that the essential auxiliary components, such as the emulsifier and electrolyte, remain in the polymers; it is thus difficult to obtain high-quality aqueous fluoropolymer dispersions. Emulsifiers, in particular, are difficult to remove, raising a problem in that the driers are rusted by gases generated in the step of drying the polymers obtained and/or the polymers are decomposed in the step of film/membrane formation to produce bubbles and/or become dark colored, for instance.

Known as a method of obtaining aqueous fluoropolymer dispersions without using any conventional emulsifier is the method which comprises polymerizing a fluoromonomer(s), such as tetrafluoroethylene or/and vinylidene fluoride, in the presence of a perfluorovinyl ether containing a sulfonic acid group or carboxyl group, which may be in the form of a salt (cf. e.g. Japanese Kokai Publication Sho-59-196308, Japanese Kokai Publication Sho-55-29519 and Japanese Kokai Publication Hei-08-67795). However, regarding this method, these publications have no description about the use of —$SO_2F$ group-containing fluorovinyl ether derivative in the step of subjecting the monomer(s) to polymerization.

Also known as a method of obtaining aqueous fluoropolymer dispersions is the method which comprises using a fluoromonomer having —$SO_3Na$ or the like in the step of polymerization to give sulfonic acid salt type fluoropolymers without using any conventional emulsifier (cf. e.g. Japanese Kokai Publication 2001-226436 and Japanese Kokai Publication 2001-226425). However, the publications cited have no description about the method of obtaining aqueous dispersions of sulfonic acid group-containing fluoropolymers.

As for the method of obtaining aqueous dispersions of sulfonic acid group-containing fluoropolymers, a method is known, among others, which comprises treating membranous molded articles prepared from —$SO_2F$ group-containing fluoropolymer with an alkali and then with an acid to convert —$SO_2F$ to the sulfonic acid group and dissolving the membranous molded articles in a mixed solvent composed of water and a lower alcohol or in water by treatment under high temperature and high pressure conditions or treating the membranous molded articles in a solvent essentially consisting of water with stirring under high temperature and high pressure conditions to give an aqueous dispersion of particles of 2 to 30 nm in size (cf. e.g. Japanese Kohyo Publication 2001-504872).

However, the method disclosed in Japanese Kohyo Publication 2001-504872 is inefficient since the fluoropolymer in liquid form as obtained by polymerization is once made into membranous molded articles and these are again made liquid. Further, it is a problem that a high-temperature and high-pressure treatment is required and, therefore, the corresponding reaction apparatus and energy are required.

Furthermore, the polymer particles obtained by the method disclosed in Japanese Kohyo Publication 2001-504872 are known to have a rod-like or thread-like shape such that the aspect ratio is generally 5 to 6 and the major axis length is about 11 nm. However, in the case of aqueous dispersions prepared by dispersing such rod-like or thread-like polymer particles, it is necessary to remove, by evaporation, a large amount of the dispersion medium in forming films/membranes by casting or impregnation, for instance. This is very inefficient, and it is difficult to produce thick films/membranes. A further problem is that cracks are readily formed in the step of drying.

SUMMARY OF THE INVENTION

In view of the above-discussed state of the art, it is an object of the present invention to provide a composition containing an acid group- and/or acid salt group-containing fluoropolymer suited for use as an electrode or membrane material, a dispersion comprising such composition, and a method for producing such dispersion. Another object of the present invention is to provide a method for producing the above dispersion without using any fluorine-containing emulsifier. A further object of the present invention is to provide a method for producing acid group- or acid-derivative-type-group-containing fluoropolymers by polymerizing in an aqueous reaction medium without using any conventional emulsifier.

The present invention thus provides a fluoropolymer solid composition which contains a fine particle comprising a fluoropolymer, said fluoropolymer having an acid/acid salt group, said acid/acid salt group each being a sulfonic acid group, $-SO_2NR^{17}R^{18}$, a carboxyl group, $-SO_3NR^1R^2R^3R^4$, $-SO_3M^1_{1/L}$, $-COONR^5R^6R^7R^8$ or $-COOM^2_{1/L}$ (in which $R^{17}$ and $R^{18}$ are the same or different and each represents a hydrogen atom, an alkali metal, an alkyl group or a sulfonyl-containing group, $R^1$, $R^2$, $R^3$ and $R^4$ are the same or different and each represents a hydrogen atom or an alkyl group having 1 to 4 carbon atoms, $R^5$, $R^6$, $R^7$ and $R^8$ are the same or different and each represents a hydrogen atom or an alkyl group having 1 to 4 carbon atoms, $M^1$ and $M^2$ are the same or different and each represents a metal whose valence is L, and said metal whose valence is L is a metal belonging to the group 1, 2, 4, 8, 11, 12 or 13 of the periodic table)

said fine particle comprising the fluoropolymer containing, at the proportion of at least 25% by mass thereof, a spherical fluoropolymer fine particle, and said spherical fluoropolymer fine particle being substantially spherical.

The present invention also provides a fluoropolymer dispersion which comprises the above-defined fluoropolymer solid composition as dispersed in a liquid medium.

The present invention further provides a method for producing a fluoropolymer dispersion to give the fluoropolymer dispersion where a fine particle comprising a fluoropolymer is dispersed in an aqueous dispersion medium.

said fluoropolymer having a sulfonic acid group and/or carboxyl group, and said method comprising a step of hydrolyzing, in an aqueous medium, $-SO_2X^1$ ($X^1$ representing a halogen atom) and/or $-COZ^1$ ($Z^1$ representing an alkoxyl group having 1 to 4 carbon atoms) which a fluoropolymer precursor has thereby to give the fluoropolymer.

The present invention further provides a method for producing a fluoropolymer dispersion to give the fluoropolymer dispersion where a fine particle comprising a fluoropolymer is dispersed in an aqueous dispersion medium, said fluoropolymer having an acid salt group, said acid salt group being $-SO_3NR^1R^2R^3R^4$, $-SO_3M^1_{1/L}$, $-COONR^5R^6R^7R^8$ or $-COOM^2_{1/L}$ (in which $R^2$, $R^2$, $R^3$ and $R^4$ are the same or different and each represents a hydrogen atom or an alkyl group having 1 to 4 carbon atoms, $R^5$, $R^6$, $R^7$ and $R^8$ are the same or different and each represents a hydrogen atom or an alkyl group having 1 to 4 carbon atoms, $M^1$ and $M^2$ are the same or different and each represents a metal whose valence is L, and said metal whose valence is L is a metal belonging to the group 1, 2, 4, 8, 11, 12 or 13 of the periodic table), and said method comprising a step of hydrolyzing, in a liquid medium, $-SO_2X^1$ ($X^1$ representing a halogen atom) and/or $-COZ^1$ ($Z^1$ representing an alkoxyl group having 1 to 4 carbon atoms) which a fluoropolymer precursor has thereby to give the fluoropolymer.

The present invention further provides a dispersion composition for thin film formation which comprises the above-defined fluoropolymer dispersion and at least one alcohol selected from the group consisting of methanol, ethanol, propanol and tetrafluoropropanol.

The present invention further provides a film/membrane obtainable by cast film formation using the above-defined fluoropolymer dispersion or the above-defined dispersion composition for thin film formation.

The present invention further provides a film/membrane obtainable by impregnating a porous support with the above-defined fluoropolymer dispersion or the above-defined dispersion composition for thin film formation, followed by removal the liquid medium.

The present invention further provides an active substance-immobilized material comprising a fluoropolymer and an active substance which is obtainable by applying, to a substrate, a liquid composition comprising the above-mentioned active substance and the above-defined fluoropolymer dispersion or the above-defined dispersion composition for thin film formation.

The present invention further provides an electrolyte membrane which comprises the above-defined active substance-immobilized material.

The present invention further provides a solid polymer electrolyte fuel cell which comprises the above-defined electrolyte membrane.

The present invention still further provides a method for producing an acid-derivative-type-group-containing fluorocopolymer which comprises carrying out a polymerization reaction of a fluorovinyl ether derivative (Rm) represented by the following general formula (VI):

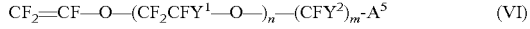

$$CF_2=CF-O-(CF_2CFY^1-O-)_n-(CFY^2)_m-A^5 \qquad (VI)$$

(wherein $Y^1$ represents a fluorine atom, a chlorine atom or a perfluoroalkyl group; n represents an integer of 0 to 3, and n atoms/groups of $Y^1$ are the same or different; $Y^2$ represents a fluorine atom or a chlorine atom; m represents an integer of 1 to 5, and m atoms of $Y^2$ may the same or different; $A^5$ represents $-SO_2X^1$, $-COZ^1$ and/or $-CONR^{19}R^{20}$; $X^1$ represents a halogen atom, $Z^1$ represents an alkoxyl group having 1 to 4 carbon atoms, and $R^{19}$ and $R^{20}$ are the same or different and each represents a hydrogen atom, an alkali metal, an alkyl group or a sulfonyl-containing group) in an aqueous reaction medium to thereby give the acid-derivative-type-group-containing fluorocopolymer, said polymerization reaction being carried out by using an acid/acid salt fluorovinyl ether derivative represented by the following general formula (VII):

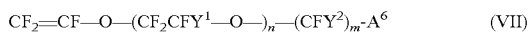

$$CF_2=CF-O-(CF_2CFY^1-O-)_n-(CFY^2)_m-A^6 \qquad (VII)$$

(wherein $Y^1$ represents a fluorine atom, a chlorine atom or a perfluoroalkyl group; n represents an integer of 0 to 3, and n atoms/groups of $Y^1$ may be the same or different; $Y^2$ represents a fluorine atom or a chlorine atom; m represents an integer of 1 to 5, and m atoms of $Y^2$ may be the same or different; $A^6$ represents —$SO_2X^3$, —$SO_2NR^{17}R^{18}$ and/or —$COOZ^3$; $X^3$ represents —$OM^5$ or —$OM^6{}_{1/2}$; $M^5$ represents an alkali metal or $NR^1R^2R^3R^4$ in which $R^1$, $R^2$, $R^3$ and $R^4$ are the same or different and each represents a hydrogen atom or an alkyl group having 1 to 4 carbon atoms; $R^5$, $R^6$, $R^7$ and $R^8$ are the same or different and each represents a hydrogen atom or an alkyl group having 1 to 4 carbon atoms; $M^6$ represents an alkaline earth metal; $R^{17}$ and $R^{18}$ are the same or different and each represents a hydrogen atom, an alkali metal, an alkyl group or a sulfonyl-containing group; $Z^3$ represents $M^7$ or $M^8{}_{1/2}$; $M^7$ represents an alkali metal or $NR^5R^6R^7R^8$ in which $R^5$, $R^6$, $R^7$ and $R^8$ are the same or different and each represents a hydrogen atom or an alkyl group having 1 to 4 carbon atoms; and $M^8$ represents an alkaline earth metal).

DETAILED DISCLOSURE OF THE INVENTION

In the following, the present invention is described in detail.

The fluoropolymer solid composition according to the present invention contains a fine particle comprising a fluoropolymer(s).

The fine particle comprising fluoropolymers contains a spherical fluoropolymer fine particle in the proportion of at least 25% by mass thereof, said spherical fluoropolymer fine particle being substantially spherical.

The phrase "contains a spherical fluoropolymer fine particle in the proportion of at least 25% by mass thereof" as used herein means that spherical fluoropolymer fine particles amount to 25% by mass or more of the fine particle comprising fluoropolymers.

The particle shape of the fine particle comprising fluoropolymers can be evaluated in terms of aspect ratio.

By saying "substantially spherical" herein, it is meant that the aspect ratio is not higher than 3. Generally, the particle shape becomes closer to spherical as the aspect ratio approaches 1. The fine particles comprising fluoropolymers preferably have an aspect ratio of not higher than 3. A more preferred upper limit is 2, and a more preferred upper limit is 1.5.

Generally, when the fine polymer particles are anisotropic in particle shape, the dispersion of the fine polymer particles tends to show a high viscosity. When a dispersion of the fine polymer particles shows a high viscosity, it unfavorably becomes difficult to increase the concentration of the fine polymer particles in the dispersion.

When the fine particles comprising fluoropolymers comprise spherical fluoropolymer fine particles which are substantially spherical, at the proportion of at least 25% by mass thereof, it is possible, for example, to lower the viscosity of a fluoropolymer dispersion prepared by using the above-mentioned fluoropolymer solid composition as compared with the case where the fine particle comprising fluoropolymers are not substantially spherical in shape, hence it becomes possible to increase the solid matter concentration of the fluoropolymer dispersion and, thus, it is possible to realize high levels of productivity in the step of film/membrane formation by casting, for instance.

The fine particles comprising fluoropolymers preferably comprise the spherical fluoropolymer fine particles at the proportion of 50% by mass or more thereof.

The fluoropolymer solid composition comprising spherical fluoropolymer fine particles within the above content range can be prepared from a dispersion obtained by emulsion polymerization. Such composition having a spherical fluoropolymer fine particle content of 90% by mass or higher can also be obtained from a dispersion obtained by emulsion polymerization. It is also possible, by incorporating the fine particles not substantially spherical into a composition comprising a relatively high proportion of spherical fluoropolymer fine particles, to provide a fluoropolymer solid composition adjusted so as to display those performance characteristics required for the intended purposes.

The above fine particles comprising fluoropolymers preferably have an average particle diameter of not smaller than 10 nm. When this is smaller than 10 nm, the particles, when used as an electrode material, may cover active sites, so that no good cell characteristics may be obtained in some instances.

When the average particle diameter is within the above range, the upper limit may be set at 300 nm, for instance, in consideration of the stability of the fluoropolymer dispersion prepared by dispersing fine particles comprising fluoropolymers in a liquid medium and/or the ease of preparation of the fluoropolymer precursor to be mentioned later herein. However, average particle diameters exceeding 300 nm will not significantly influence the cell characteristics.

The above-mentioned fine particles comprising fluoropolymers more preferably have an average particle diameter of 10 to 300 nm. A more preferred lower limit to the average particle diameter is 30 nm, and a more preferred upper limit is 160 nm.

The above-mentioned aspect ratio and average particle diameter can be determined by observing, under a scanning or transmission electron microscope, an atomic force microscope or the like, an aggregate of the fine particles comprising fluoropolymers as obtained by applying the fluoropolymer dispersion onto a glass substrate, followed by removal of the aqueous dispersion medium, measuring the major axes and minor axes of at least 20 fine particles on the picture obtained and calculating the aspect ratio, namely the average major axis-to-minor axis ratio (major axis/minor axis), and the average particle diameter, which is the mean of the major axes and minor axes and which is to be mentioned later herein.

The fluoropolymer solid composition of the present invention preferably contains, at the proportion of at least 25% by mass thereof, spherical fluoropolymer fine particles not smaller in average particle diameter than 10 nm among the fine particles comprising fluoropolymers.

The fluoropolymer solid composition of the present invention more preferably contains, at the proportion of at least 25% by mass thereof, spherical fluoropolymer fine particles whose average particle diameter is 10 to 300 nm among the fine fluoropolymer particles.

Still more preferably, the fluoropolymer solid composition of the present invention contains, at the proportion of at least 25% by mass thereof, spherical fluoropolymer fine particles whose average particle diameter is 30 to 160 nm among the fine fluoropolymer particles.

The above-mentioned fluoropolymer has acid/acid salt groups.

The acid/acid salt groups each refers to an acid group and/or an acid salt group.

The acid group is a sulfonic acid group, —$SO_2NR^{17}R^{18}$ and/or a carboxyl group. $R^{17}$ and $R^{18}$ are the same or different and each represents a hydrogen atom, an alkali metal, an alkyl group or a sulfonyl-containing group.

The above alkali metal is not particularly restricted but may be, for example, Li, Na, K or Cs. The alkyl group is not particularly restricted but includes an alkyl group having 1 to 4 carbon atoms, such as methyl or ethyl. The alkyl group may be substituted by a halogen atom(s). The sulfonyl-containing group is a sulfonyl group- and fluorine-containing alkyl group, for example a fluorine-containing alkylsulfonyl group, which may have a substituent(s) at its terminus. As the fluorine-containing alkylsulfonyl group, there may be mentioned, among others, —$SO_2R_f^1Z^3$ ($R_f^1$ representing a fluorine-containing alkylene group and $Z^3$ representing an organic group). As the organic group, there may be mentioned, for example, —$SO_2F$, which may take an infinitely connected form such as —$SO_2$—$(NR^{17}SO_2R_f^1SO_2)_kNR^{17}SO_2$— (in which k represents an integer not smaller than 1 and $R_f^1$ represents a fluorine-containing alkylene group), or the organic group may be —$SO_2(NR^{17}SO_2R_f^1SO_2)_kNR^{17}SO_2F$ (in which k represents an integer not smaller than 1 but not greater than 100 and $R^{17}$ and $R_f^1$ are as defined above), for instance.

The acid salt group mentioned above comprises a sulfonic acid group in salt form and/or a carboxyl group in salt form. The sulfonic acid in salt form is —$SO_3NR^1R^2R^3R^4$ or —$SO_3M^1_{1/L}$, and the carboxyl group in salt form is —$COONR^5R^6R^7R^8$ or —$COOM^2_{1/L}$, wherein $R^1$, $R^2$, $R^3$ and $R^4$ are the same or different and each represents a hydrogen atom or an alkyl group having 1 to 4 carbon atoms, $R^5$, $R^6$, $R^7$ and $R^8$ are the same or different and each represents a hydrogen atom or an alkyl group having 1 to 4 carbon atoms, $M^1$ and $M^2$ are the same or different and each represents a metal having a valence of L.

The metal having a valence of L is a metal belonging to the group 1, 2, 4, 8, 11, 12 or 13 of the periodic table. The metal having a valence of L is not particularly restricted but includes, for example, Li, Na, K and Cs as the group 1 metal, Mg and Ca as the group 2 metal, Al as the group 4 metal, Fe as the group 8 metal, Cu and Ag as the group 11 metal, Zn as the group 12 metal, and Zr as the group 13 metal. The alkyl group having 1 to 4 carbon atoms is not particularly restricted but preferably is a straight alkyl group, more preferably a methyl group.

Preferably, the existence of the acid/acid salt groups on the particle surface of the fine particles comprising fluoropolymers is more than that in the particle inside thereof. For use as ion exchange resins or the like, in particular, it is desirable that the existence on the particle surface be greater. When the existence of acid/acid salt groups are greater on the particle surface than in the particle inside, the dispersion stability can be improved.

The fine fluoropolymer particles in which the existence of the acid/acid salt group on the particle surface is more than in the particle inside can be obtained by using the so-called "core/shell" technology in the method for producing the fluoropolymer dispersion by emulsion polymerization according to the present invention. Namely, they can be obtained by increasing the rate of feed of the acid/acid salt group-containing fluorovinyl ether derivative, which is to be described later herein, at the late stage of polymerization as compared with the early stage of polymerization.

The term "particle inside" as used herein means the central portion occupying 50% by mass of the whole particle mass. The term "particle surface" as used herein means the portion of the particle other than the particle inside defined above.

The fluoropolymer solid composition of the present invention may comprise, in addition to the above-mentioned fine particle comprising fluoropolymers, one or more additives as necessary. The additives are not particularly restricted but include, among others, fluororesins such as polytetrafluoroethylene [PTFE], tetrafluoroethylene/hexafluoropropylene copolymers [FEPs] and tetrafluoroethylene/perfluoro(alkylvinylether) copolymers [PFAs]; thermoplastic resins such as polyethylene, polypropylene and polyethylene terephthalate [PET]; thermosetting resins such as polyamides and polyimides; fine particles of another ion exchange resin or the like; and fine powders of inorganic materials such as alumina, silica, zirconia and carbon.

Generally, the fluoropolymer solid composition of the present invention can be obtained by drying the fluoropolymer dispersion to be described later herein. As for the procedure for obtaining the fluoropolymer solid composition from the fluoropolymer dispersion, there may be mentioned, for example, the method which comprises concentrating the fluoropolymer dispersion and drying the concentrate at a temperature of 80 to 400° C.

When applied to a substrate, the fluoropolymer solid composition of the present invention may take the form of a coating film formed on the substrate by heating for drying at the above-mentioned temperature of 80 to 400° C. and then further heating to a temperature not less than the melting point of the fine particle comprising fluoropolymers.

The particle shape and average particle diameter of the fine particles comprising fluoropolymers as referred to hereinabove are those after the above heating for drying, and the requirements imposed thereon are to be met only in the state not yet subjected to heating at a temperature not less than the melting point of the fine particles comprising fluoropolymers.

The fluoropolymer dispersion of the present invention comprises the above-mentioned fine particles comprising fluoropolymers as dispersed in a liquid medium.

The liquid medium is a liquid capable of wetting the fine particles comprising fluoropolymers. The liquid medium is not particularly restricted but preferably occurs as a liquid at room temperature.

Where good dispersibility is required of the fine particles comprising fluoropolymers, not only water but also alcohols such as methanol; nitrogen-containing solvents such as N-methylpyrrolidone [NMP]; ketones such as acetone; esters such as ethyl acetate; polar ethers such as diglyme and tetrahydrofuran [THF] and the like; carbonate esters such as diethylene carbonate and other polar organic solvents may be mentioned as the liquid medium, and one of these or a mixture of two or more of these can be used as such. For producing films or membranes by casting, impregnation or a like technique, as mentioned later herein, alcohols may be used as the liquid medium for leveling properties improvement, and polyoxyethylenes for film-forming properties improvement.

The fluoropolymer dispersion of the present invention may be one comprising the above-mentioned fluoropolymer solid composition as dispersed in a liquid medium or one prepared from the dispersion obtained by the polymerization reaction as such without taking the form of the above-mentioned fluoropolymer solid composition.

When the fluoropolymer dispersion comprises a fluoropolymer solid composition as dispersed in a liquid medium, the fluoropolymer solid composition preferably amounts to 2 to 80% by mass relative to the whole mass of the fluoropolymer dispersion. The amount of the fine particles comprising fluoropolymers in the fluoropolymer dispersion generally corresponds to the mass of the solid matter in the fluoropolymer dispersion. When the content of the fluoropolymer solid composition in the fluoropolymer dispersion is lower than 2% by mass, the amount of the liquid medium becomes fairly large, and decreases in productivity may result in film/membrane formation. Conversely, when it exceeds 80% by mass, the viscosity becomes excessively high and the dispersion tends to become difficult to handle. A more preferred lower limit is 5% by mass, and a more preferred upper limit is 60% by mass.

The fluoropolymer dispersion of the present invention is preferably one in which the dispersion medium is an aqueous dispersion medium. In this case, the fluoropolymer dispersion of the present invention comprises fine particles comprising fluoropolymers as dispersed in an aqueous dispersion medium, namely it comprises the fine particles comprising fluoropolymers and the aqueous dispersion medium. The fluoropolymer dispersion comprises the fine particles comprising fluoropolymers as the dispersoid and the aqueous dispersion medium as the dispersion medium.

The "aqueous dispersion medium" so referred to herein is the dispersion medium in the fluoropolymer dispersion and comprises water. So long as it comprises water, the aqueous dispersion medium may be composed of water and, further, a water-soluble organic solvent. The aqueous dispersion medium may contain one or more of those additives which are generally used in aqueous dispersions, for example surfactants and stabilizers.

The aqueous dispersion medium preferably has a water content of 10 to 100% by mass. When the content is below 10% by mass, deteriorated dispersibility will result and unfavorable effects on the environment and human body may also be produced. A more preferred lower limit is 40% by mass.

The fluoropolymer dispersion of the present invention can be produced by the method for producing a fluoropolymer dispersion according to the present invention which essentially comprises converting a sulfonic acid or carboxylic acid halide of a fluoropolymer precursor obtained by the polymerization reaction to the acid salt group by hydrolysis in an aqueous medium, or by converting this acid salt group to the acid group by treatment with an acid in an aqueous medium. When the acid/acid salt group is —$SO_2NR^{17}R^{18}$, the fluoropolymer dispersion of the present invention can be prepared in the form of a dispersion which comprises a fluoropolymer solid composition containing fine particles of the —$SO_2NR^{17}R^{18}$-containing fluoropolymer as dispersed in a liquid medium.

In the present specification, among those methods of producing fluoropolymer dispersions according to the present invention, the method for obtaining the acid salt group is sometimes referred to as "method (i) for producing a fluoropolymer dispersion", and the method for obtaining the sulfonic acid group and/or carboxylic acid group as the acid group is sometimes referred to as "method (ii) for producing a fluoropolymer dispersion".

The method (i) for producing a fluoropolymer dispersion according to the present invention is intended to obtain fluoropolymer dispersions which comprises fine particles comprising fluoropolymers as dispersed in the liquid medium mentioned above.

In the method (i) for producing a fluoropolymer dispersion according to the present invention, the fluoropolymer has acid salt groups. The acid salt group is the same as the sulfonic acid group in salt form or the carboxyl group in salt form as described hereinabove referring to the fluoropolymer solid composition.

The method (i) for producing a fluoropolymer dispersion according to the present invention comprises the same step as the step of obtaining the acid salt group in the method (ii) for producing a fluoropolymer dispersion which is to be described later herein.

Therefore, like the method (ii) for producing a fluoropolymer dispersion, which is to be described later herein, the method (i) for producing a fluoropolymer dispersion according to the present invention comprises the step of hydrolyzing —$SO_2X^1$ ($X^1$ representing a halogen atom) and/or —$COZ^1$ ($Z^1$ representing an alkoxyl group having 1 to 4 carbon atoms) of a fluoropolymer precursor in a liquid medium to give the corresponding fluoropolymer.

The term "fluoropolymer precursor" as used herein means a polymer to give fluoropolymer through the above-mentioned step of hydrolysis in a liquid medium.

The method (i) for producing a fluoropolymer dispersion according to the present invention has the same characteristic features as the method (ii) for producing a fluoropolymer dispersion which is to be described later herein. In one of the features, the above-mentioned hydrolyzing step may comprise the polymerization reaction step comprising the polymerization in the presence of a fluoromonomer (Pm) and a fluoromonomer (Qm) and the alkali treatment step of treating with an alkali.

The above-mentioned fluoromonomer (Pm) has —$SO_2X^1$ ($X^1$ representing a halogen atom) and/or —$COZ^1$ ($Z^1$ representing an alkoxyl group having 1 to 4 carbon atoms), and the above-mentioned fluoromonomer (Qm) has —$SO_2X^2$ ($X^2$ representing —$ONR^9R^{10}R^{11}R^{12}$ or —$OM^1_{1/L}$ in which $R^9$, $R^{10}$, $R^{11}$ and $R^{12}$ are the same or different and each represents a hydrogen atom or an alkyl group having 1 to 4 carbon atoms and $M^1$ represents a metal whose valence is L) and/or —$COOZ^2$ ($Z^2$ representing $NR^{13}R^{14}R^{15}R^{16}$ or -$M^2_{1/L}$ in which $M^2$ represents a metal whose valence is L).

The method (ii) for producing a fluoropolymer dispersion according to the present invention is intended for producing fluoropolymer dispersions which comprises fine particles comprising fluoropolymers as dispersed in an aqueous medium.

The above "method (ii) for producing a fluoropolymer dispersion", which is to produce fluoropolymer dispersions in which the dispersion medium is an aqueous dispersion medium and the dispersoid fluoropolymer has a sulfonic acid group and/or carboxyl group, is conceptually different from the above "method (i) for producing a fluoropolymer dispersion", in which method the dispersion medium is a liquid medium and the fluoropolymer has an acid salt group. By merely saying "method for producing a fluoropolymer dispersion" in the present specification, it is meant that the above-mentioned method (ii) for producing a fluoropolymer dispersion and method (i) for producing a fluoropolymer dispersion are referred to without distinction therebetween.

In carrying out the method (ii) for producing a fluoropolymer dispersion according to the present invention, the fluoropolymer has a sulfonic acid group and/or carboxyl group.

The sulfonic acid group and/or carboxyl group is preferably one bound to a fluoroether side chain represented by the following general formula (I):

$$\text{—O—}(CF_2CFY^1\text{—O})_n\text{—}(CFY^2)_m \qquad (I)$$

(wherein $Y^1$ represents a fluorine atom, a chlorine atom or a perfluoroalkyl group; n represents an integer of 0 to 3, and n atoms/groups of $Y^2$ are the same or different; $Y^2$ represents a fluorine atom or chlorine atom; m represents an integer of 1 to 5, and m atoms of $Y^2$ may be the same or different). The sulfonic acid group and/or carboxyl group is bound to the fluoroether side chain so that it may be adjacent to —$(CFY^2)_m$— in the above general formula (I).

The above fluoroether side chain is preferably one forming an ether bond with a carbon atom constituting the fluoroethylene unit in the main chain of the fluoropolymer. The term "fluoroethylene unit" as used herein means the part derivative from the perfluorovinyl group of a monomer constituting the fluoropolymer in the molecular structure of the fluoropolymer. Generally, the perfluorovinyl group is a group derived from the fluorovinyl ether derivative composed of the above-mentioned perfluorovinyl group and the above-mentioned fluoroether side chain bound to each other. The term "forming an ether bond" refers to the ether bonding of the fluoroether side chain represented by the above general formula (I) via a divalent oxygen atom in such a form as

as a result of substitution of a fluorine atom bound to a carbon atom constituting the perfluoroethylene unit [—($CF_2$—$CF_2$)—].

The method (ii) for producing a fluoropolymer dispersion according to the present invention is to produce the above-mentioned fluoropolymer dispersions, and the method (ii) for producing a fluoropolymer dispersion comprises the hydrolysis step of hydrolyzing —$SO_2X^1$ and/or —$COZ^1$ of the fluoropolymer precursor in an aqueous medium to give the fluoropolymer.

The term "aqueous medium" as used herein means a medium in which the hydrolysis is carried out in the above-mentioned hydrolysis step and which comprises water. The hydrolysis is carried out in an aqueous dispersion comprising an aqueous medium and a fluoropolymer precursor. The aqueous system in which this hydrolysis is carried out comprises at least an aqueous medium as the dispersion medium and fine particles of the above-mentioned fluoropolymer precursor as the dispersoid before the start of the hydrolysis and, after completion of the above-mentioned hydrolysis step, it comprises at least the above-mentioned fine particles comprising fluoropolymers as the dispersoid. So long as it comprises water, the above-mentioned aqueous medium may comprise water and a water-soluble organic solvent.

When, in carrying out the method for producing a fluoropolymer dispersion according to the present invention, the fluoropolymer precursor has —$SO_2X^1$— and/or —$COZ^1$, the above hydrolysis step preferably comprises the alkali treatment step in which the fluoropolymer precursor is treated with an alkali (such step hereinafter sometimes referred to as "alkali treatment step ($A_{alk}$)") The above hydrolysis step is hereinafter referred to as "hydrolysis step (A)". The —$SO_2X^1$— and/or —$COZ^1$-containing fluoropolymer precursor mentioned above is hereinafter referred to as "fluoropolymer precursor (P)". The fluoropolymer precursor (P) has preferably —$SO_2X^1$.

The above symbol $X^1$ represents a halogen atom. The halogen atom $X^1$ is not particularly restricted but may be any of fluorine, chlorine, bromine and iodine atoms. Preferably, however, it is a fluorine atom or a chlorine atom, more preferably a fluorine atom.

The above symbol $Z^1$ represents an alkoxyl group having 1 to 4 carbon atoms. The alkoxyl group having 1 to 4 carbon atoms as represented by $Z^1$ is not particularly restricted but preferably is an n-alkoxyl group, more preferably a methoxy group.

The group —$SO_2X^1$— is preferably —$SO_2F$, and the group —$COZ^1$ is preferably —$COOCH_3$.

When the alkali treatment step ($A_{alk}$) is carried out, the groups —$SO_2X^1$ and/or —$COZ^1$ of the fluoropolymer precursor (P) are converted to acid salt groups. The term "acid salt group" as used herein means a sulfonic acid and/or carboxyl group in salt form. The acid salt group preferably forms an alkali metal salt or an alkaline earth metal salt.

The hydrolysis step (A) preferably comprises the alkali treatment step ($A_{alk}$) and further the subsequent step of neutralization treatment with an acid (hereinafter sometimes referred to as "acid treatment step ($A_{acd}$)"). When the acid treatment step ($A_{acd}$) is carried out, the acid salt group obtained by the alkali treatment step ($A_{alk}$) is converted to the sulfonic acid group and/or carboxyl group.

The end point of the hydrolysis reaction in the hydrolysis step (A) can be detected as a point of time at which the alkali and acid are no more consumed and the pH stabilizes.

The hydrolysis step (A) preferably comprises the alkali treatment step ($A_{alk}$) and, further, a subsequent step of removing a low-molecular-weight substance (hereinafter sometimes referred to as "low-molecular-weight substance elimination step ($A_{rmv}$)"). The low-molecular-weight substances are, for example, the residual monomers remaining in the polymerization reaction step, polymerization initiator residues, unrequired low-molecular-weight polymers and/or substances formed upon treatment of the fluoropolymer precursor (P) with an alkali. In cases where there exist the residues of the emulsifier and the like used in the polymerization reaction, these can also be removed.

The low-molecular-weight substance elimination step ($A_{rmv}$) can be carried out by centrifugation method, electrophoresis method or ultrafiltration method, for instance. The ultrafiltration method is preferably used, however, since it is superior in productivity. The ultrafiltration method is not particularly restricted but may be any of the methods by using an ultrafiltration apparatus comprising an ultrafiltration membrane for removing a low-molecular-weight substance. Thus, it includes, among others, the centrifugal ultrafiltration method and the circulating ultrafiltration method. The ultrafiltration membrane and the ultrafiltration membrane-containing ultrafiltration apparatus are adequately selected according to the molecular weights and types of the low-molecular-weight substances to be removed, the aqueous medium species, the molecular weight and type of the fluoropolymers, and other factors. Suited for use as the ultrafiltration membrane-containing ultrafiltration apparatus are commercially available ones. For the laboratory use, there may be mentioned Centriprep centrifugal filter units (product of Amicon) and Millitan (product of Millipore), for instance. It is also possible, in the ultrafiltration step, to concentrate the fluoropolymer obtained. The fluoropolymer solid composition obtained by concentration or evaporating to dryness the fluoropolymer dispersion purified by using the above-mentioned ultrafiltration method is preferred in view of its low impurity content.

The low-molecular-weight elimination step ($A_{rmv}$) may be carried out either before or after the acid treatment step ($A_{acd}$).

When, in carrying out the method for producing a fluoropolymer dispersion according to the present invention, the fluoropolymer precursor is the product of polymerization in the presence of a fluoromonomer (Pm) containing —$SO_2X^1$ and/or —$COZ^1$ and a fluoromonomer (Qm) containing —$SO_2X^2$ ($X^2$ representing —$OM^3$ or —$OM^4_{1/2}$ in which $M^3$ represents an alkali metal or $NR^1R^2R^3R^4$, $R^1$, $R^2$, $R^3$ and $R^4$ are the same or different and each represents a hydrogen atom or an alkyl group having 1 to 4 carbon atoms and $M^4$ represents an alkaline earth metal) and/or —$COOZ^2$ ($Z^2$ representing $M^5$ or $M^6_{1/2}$ in which $M^5$ represents an alkali metal or $NR^5R^6R^7R^8$, $R^5$, $R^6$, $R^7$ and $R^8$ are the same or different and each represents a hydrogen atom or an alkyl group having 1 to 4 carbon atoms and $M^6$ represents an alkaline earth metal), the hydrolysis step preferably comprises the polymerization reaction step for obtaining the fluoropolymer precursor, the alkali treatment step comprising treatment with an alkali (hereinafter sometimes referred to as "alkali treatment step ($B_{alk}$)") and the step of neutralization with an acid (hereinafter sometimes referred to as "acid treatment step ($B_{acd}$)"), in that order. The above hydrolysis step is hereinafter referred to as "hydrolysis step (B)". The fluoromonomer (Pm) is preferably one having —$SO_2X^1$, and the fluoromonomer (Qm) is preferably one having —$SO_2X^2$.

The symbol $X^2$ represents —$OM^3$ or —$OM^4{}_{1/2}$; $M^3$ represents an alkali metal or $NR^1R^2R^3R^4$, $R^1$, $R^2$, $R^3$ and $R^4$ are the same or different and each represents a hydrogen atom or an alkyl group having 1 to 4 carbon atoms and $M^4$ represents an alkaline earth metal. The alkyl group having 1 to 4 carbon atoms is not particularly restricted but may be any of methyl, ethyl, propyl and butyl groups. The alkali metal is not particularly restricted but may be Li, Na, K, Cs, for instance, and the alkaline earth metal is not particularly restricted but may be Mg or Ca, for instance.

The symbol $Z^2$ represents $M^5$ or $M^6{}_{1/2}$, and $M^5$ represents an alkali metal or $NR^5R^6R^7R^8$, $R^5$, $R^6$, $R^7$ and $R^8$ are the same or different and each represents a hydrogen atom or an alkyl group having 1 to 4 carbon atoms and $M^6$ represents an alkaline earth metal. The alkali metal, alkaline earth metal and alkyl group having 1 to 4 carbon atoms each is not particularly restricted but includes the same ones as mentioned above referring to $X^2$.

In the above polymerization reaction step, the fluoropolymer precursor can be obtained, for example, by carrying out the polymerization in the presence of a fluoromonomer (Pm1) represented by the following general formula (III):

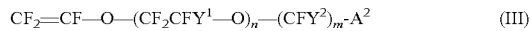

$$CF_2=CF—O—(CF_2CFY^1—O)_n—(CFY^2)_m-A^2 \quad (III)$$

(wherein $Y^1$ represents a fluorine atom, a chlorine atom or a perfluoroalkyl group; n represents an integer of 0 to 3 and the n atoms/groups of $Y^1$ may be the same or different; $Y^2$ represents a fluorine atom or a chlorine atom; m represents an integer of 1 to 5 and m atoms of $Y^2$ may be the same or different; $A^2$ represents —$SO_2X^1$ and/or —$COZ^1$, $X^1$ represents a halogen atom and $Z^1$ represents an alkoxyl group having 1 to 4 carbon atoms) and a fluoromonomer (Qm1) represented by the general formula (IV):

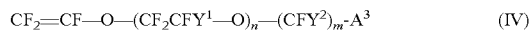

$$CF_2=CF—O—(CF_2CFY^1—O)_n—(CFY^2)_m-A^3 \quad (IV)$$

(wherein $Y^1$, n, $Y^2$ and m are defined above; $A^3$ represents —$SO_2X^2$ and/or —$COZ^2$, $X^2$ represents —$OM^3$ or —$OM^4{}_{1/2}$, $M^3$ represents an alkali metal or $NR^1R^2R^3R^4$, $R^1$, $R^2$, $R^3$ and $R^4$ are the same or different and each represents a hydrogen atom or an alkyl group having 1 to 4 carbon atoms, $M^4$ represents an alkaline earth metal, $Z^2$ represents $M^5$ or $M^6{}_{1/2}$, $M^5$ represents an alkali metal or $NR^5R^6R^7R^8$, $R^5$, $R^6$, $R^7$ and $R^8$ are the same or different and each represents a hydrogen atom or an alkyl group having 1 to 4 carbon atoms, and $M^6$ represents an alkaline earth metal). The fluoropolymer precursor obtained in the above polymerization step can take, in the aqueous medium, the core/shell structure in which the core is a polymer chain comprising the monomer (Pm) and the shell is a polymer chain comprising the monomer (Qm), since the above-mentioned —$SO_2X^2$ and/or —$COZ^2$ is hydrophilic and the above-mentioned —$SO_2X^1$ and/or —$COZ^1$ is hydrophobic. In the above polymerization reaction step, the fluoromonomer (Qm) and polymer chains comprising the fluoromonomer (Qm) have emulsifying activity and, therefore, it is no more necessary to add such an emulsifier as is generally used in the conventional cases of emulsion polymerization, hence emulsifier removal in a subsequent step is not necessary.

When the above alkali treatment step ($B_{alk}$) is carried out, —$SO_2X^1$ and/or —$COZ^1$ which the polymer chain comprising the fluoromonomer (Pm) has are converted to acid salt groups and, when the above acid treatment step ($B_{acd}$) is then carried out, the acid salt groups are converted to sulfonic acid and/or carboxyl groups and —$SO_2X^2$ and/or —$COZ^2$ which the polymer chains comprising the fluoromonomer (Qm) has are converted to sulfonic acid groups and/or carboxyl groups.

The end point of the hydrolysis reaction in the hydrolysis reaction (B) can be detected as a point of time at which the alkali and acid are no more consumed and the pH stabilizes.

In the hydrolysis step (B), the fluoropolymer precursor may be, for example, a seed polymerization product obtained by carrying out the polymerization in the presence of the above-mentioned fluoromonomer (Pm) and a fluoromonomer (Qm)-based polymer obtained by polymerizing the above-mentioned fluoromonomer (Qm). Like polymer chains comprising the fluoromonomer (Qm) and fluoromonomer (Pm), the above seed polymerization product has emulsifying activity and, therefore, it is no more necessary to add such an emulsifier as is generally used in the conventional cases of emulsion polymerization, hence emulsifier removal in a subsequent step is not necessary. The method for producing a fluoropolymer dispersion according to the present invention requires no such subsequent step and, in this respect, can be said to be a method capable of efficiently producing sulfonic acid group- and/or carboxyl group-containing fluoropolymer dispersions and fluoropolymer solid compositions.

The above hydrolysis step (B) preferably comprises the alkali treatment step ($B_{alk}$) and further a subsequent step of removing a low-molecular-weight substance (hereinafter sometimes referred to as "low-molecular-weight substance elimination step ($B_{rmv}$)"). The low-molecular-weight substances are, for example, residual monomers remaining in the polymerization reaction step, polymerization initiator residues, unrequired low-molecular-weight polymers, and/or substances obtained by treatment of the fluoropolymer precursor with alkali, such as those mentioned hereinabove referring to the low-molecular-weight substance elimination step ($A_{rmv}$). Like the low-molecular-weight substance elimination step ($A_{rmv}$), other low-molecular-weight substances can also be removed.

The low-molecular-weight substance elimination step ($B_{rmv}$) can be carried out in the same manner as the low-molecular-weight substance elimination step ($A_{rmv}$), and use is preferably made of the same ultrafiltration method as the ultrafiltration method in the low-molecular-weight substance elimination step ($A_{rmv}$).

The above low-molecular-weight substance elimination step ($B_{rmv}$) may be carried out either before or after the acid treatment step ($B_{acd}$).

When the fluoropolymer precursor is —$SO_2X^1$-containing one ($X^1$ representing a halogen atom), it generally tends to coagulate and be unstable upon addition of an acid. In accordance with the method for producing a fluoropolymer dispersion according to the present invention, however, an alkali is added and therefore, unless the alkali is added hastily, the fluoropolymer precursor can avoid coagulating and can be maintained in a state stably dispersed in an aqueous medium and —$SO_2X^1$ can be quantitatively converted to a sulfonic acid salt group.

The method for producing a fluoropolymer dispersion according to the present invention is intended to obtain fluoropolymer dispersions and comprises the hydrolysis step for hydrolyzing —$SO_2X$ and/or —$COZ^1$ which the fluoropolymer precursor has in an aqueous medium to give the corresponding fluoropolymer. The term "fluoropolymer precursor" as used herein means a polymer which gives the fluoropolymer through the above-mentioned hydrolysis step.

The above symbol X represents a halogen atom, —$OM^3$ or —$OM^4{}_{1/2}$, $M^3$ represents an alkaline metal or $NR^9R^{10}R^{11}R^{12}$, and $M^4$ represents an alkaline earth metal. The halogen atom represented by X includes those enumerated hereinabove referring to $X^1$.

The above-mentioned —$SO_2X$ is preferably —$SO_2F$, and the above-mentioned —$COZ^1$ is preferably —$COOCH_3$.

When subjected to the above hydrolysis step, —$SO_2X$ and/or —$COZ^1$ which the fluoropolymer precursor has is converted to —$SO_3^-$ and/or —$COO^-$ either via an acid salt group or without taking the form of an acid salt group depending on the kind of X and or $Z^1$. The above hydrolysis step may be carried out using an alkali, and an acid for neutralization.

When the fluoropolymer precursor has —$SO_2X^1$ ($X^1$ representing a halogen atom) and/or —$COZ^1$ ($Z^1$ representing an alkoxyl group having 1 to 4 carbon atoms), the hydrolysis can be carried out using an alkali, and an acid for neutralization in that order. Upon treatment with an alkali, —$SO_2X^1$ and/or —$COZ^1$ which the fluoropolymer precursor has is converted to an acid salt group and, then, upon treatment with an acid, the above acid salt group can be converted to the sulfonic acid group and/or carboxyl group.

The alkali to be used in the above hydrolysis step is not particularly restricted but may be any of those alkalis which are generally used in hydrolysis, including alkali metal or alkaline earth metal hydroxides, among others. As such hydroxides, there may be mentioned sodium hydroxide, potassium hydroxide and lithium hydroxide, for instance.

The acid to be used in the above hydrolysis step is not particularly restricted but may be any of those acids which are generally used in hydrolysis, including mineral acids, among others. As such mineral acids, there may be mentioned hydrochloric acid and sulfuric acid, for instance.

The alkali and acid to be used in the above hydrolysis step can be used also in the hydrolysis step (A) and hydrolysis step (B).

The above hydrolysis step can be carried out in the aqueous medium mentioned above.

The aqueous medium may be one originating in the aqueous polymerization reaction medium to be mentioned later herein. The polymerization reaction is intended to obtain the above-mentioned fluoropolymer precursor. The polymerization reaction for obtaining such fluoropolymer precursor in accordance with the present invention is herein sometimes referred to as "polymerization reaction step". The polymerization reaction for obtaining the fluoropolymer precursor is preferably carried out by emulsion polymerization, as mentioned later herein. In the case of emulsion polymerization, the above polymerization reaction is carried out in an aqueous reaction medium. The term "aqueous reaction medium" as used herein means a medium in which the polymerization reaction is allowed to proceed and which comprises water. When it is carried out in such aqueous reaction medium, the above polymerization reaction is carried out in an aqueous dispersion composed of the aqueous reaction medium and fine particles comprising fluoropolymers precursor formed as the polymerization reaction proceeds. The aqueous dispersion in which the polymerization reaction is carried out comprises the aqueous reaction medium as the dispersion medium and the fine particles comprising fluoropolymers precursor as the dispersoid. So long as it comprises water, the aqueous reaction medium may be composed of water and a water-soluble organic solvent. Preferably, however, it is free of any water-soluble organic solvent. The aqueous reaction medium may contain one or more of those additives which are generally used in aqueous dispersions, for example surfactants, stabilizers, and those existing emulsifiers and emulsifying agents which are to be described later herein. In cases where the aqueous medium is one derived from the aqueous reaction medium, the aqueous reaction medium as such can be used, after the polymerization reaction step, as the aqueous medium in the above-mentioned hydrolysis step of carrying out the hydrolysis reaction therein.

The aqueous medium in the hydrolysis step as such can be used, after the hydrolysis step, as the aqueous dispersion medium for the fluoropolymer dispersion. In this case, the aqueous dispersion medium is one derived from the aqueous medium mentioned above.

The above-mentioned aqueous medium is the dispersion medium in the aqueous dispersion in which the above-mentioned hydrolysis is carried out, the aqueous dispersion medium is the dispersion medium in the fluoropolymer dispersion obtained through the hydrolysis step in which the above-mentioned hydrolysis is carried out, and the aqueous reaction medium is the dispersion medium in the aqueous dispersion in which the polymerization reaction is carried out. In this respect, the aqueous medium, aqueous dispersion medium and aqueous reaction medium are conceptually different from one another.

When the method for producing a fluoropolymer dispersion according to the present invention comprises the above-mentioned hydrolysis step and, further, the polymerization reaction step, as described later herein, the fluoropolymer dispersion can be produced in an aqueous system through the polymerization reaction step and hydrolysis step. The phrase "in an aqueous system" means "in a medium comprising water". The method for producing a fluoropolymer dispersion according to the present invention can be carried out in a medium comprising water from the above-mentioned polymerization reaction step to the fluoropolymer dispersion production through the above-mentioned hydrolysis step. In cases where, in carrying out the method for producing a fluoropolymer dispersion according to the present invention, the polymerization reaction in the polymerization reaction step is carried out by emulsion polymerization, as mentioned above, the aqueous reaction medium can be used as such medium comprising water; this aqueous reaction medium can be used, after completion of the polymerization reaction step, as the aqueous medium in the following hydrolysis step, and this aqueous medium can be used, after completion of the hydrolysis step, as the aqueous dispersion medium in the fluoropolymer dispersion.

When the fluoropolymer dispersion production through the above polymerization reaction step and hydrolysis step is carried out in an aqueous system, as mentioned above, the method for producing a fluoropolymer dispersion according to the present invention can produce the fluoropolymer dispersion without drying the fluoropolymer precursor and fluoropolymer. The phrase "without drying the fluoropolymer precursor and fluoropolymer" means that the fluoropolymer precursor and fluoropolymer each occurs in the aqueous medium. In cases where the fluoropolymer precursor and fluoropolymer each occurs in the aqueous medium, the above-mentioned acid salt group-containing intermediate possibly formed, according to the species of X in —$SO_2X$ and/or the species of $Z^1$ in —$COZ^1$, in the course of the formation of the fluoropolymer from the fluoropolymer precursor through the hydrolysis step is formed in the aqueous medium and remains in the aqueous medium until it is converted to the sulfonic acid group- and/or carboxyl group-containing fluoropolymer.

The reaction temperature in the hydrolysis step is not particularly restricted. Thus, the reaction may be carried out at room temperature but, from the reaction rate viewpoint, the reaction is preferably carried out at 30 to 100° C. The concentration of the fluoropolymer precursor in carrying out the hydrolysis is not particularly restricted but, when it is 5-15% by mass relative to the aqueous medium, the dispersion comprising the aqueous medium and fluoropolymer precursor has a viscosity within a preferred range and the particles of the fluoropolymer precursor are distributed uniformly, hence the hydrolysis proceeds smoothly. The reaction temperature may be selected in the same manner in the hydrolysis step (A) as well as in the hydrolysis step (B).

When, after completion of the alkali hydrolysis reaction, the reaction mixture is subjected to ultrafiltration, as described later herein, the residual monomers remaining in the polymerization reaction step, polymerization initiator residues, unrequired low-molecular-weight polymers and/or substances formed upon alkali treatment of the fluoropolymer precursor can be removed and, if there are an emulsifier and like additive(s) remaining after the polymerization reaction, these can also be removed.

The above-mentioned fluoropolymer precursor is one obtained by subjecting to polymerization a fluorovinyl ether derivative represented by the following general formula (II):

$$CF_2=CF-O-(CF_2CFY^1-O)_n-(CFY^2)_m-A^1 \quad (II)$$

(wherein $Y^1$ represents a fluorine atom, a chlorine atom or a perfluoroalkyl group; n represents an integer of 0 to 3, and n atoms/groups of $Y^1$ may be the same or different; $Y^2$ represents a fluorine atom or a chlorine atom; m represents an integer of 1 to 5, and m atoms of $Y^2$ may be the same or different; $A^1$ represents $-SO_2X$ or $-COZ^1$; $X^1$ represents a halogen atom, $-OM^3$ or $-OM^4{}_{1/2}$, $M^3$ represents an alkali metal or $NR^9R^{10}R^{11}R^{12}$, $M^4$ represents an alkaline earth metal, $R^9$, $R^{10}$, $R^{11}$ and $R^{12}$ may be the same or different and each represents a hydrogen atom or an alkyl group having 1 to 4 carbon atoms, and $Z^1$ represents an alkoxyl group having 1 to 4 carbon atoms).

When the fluoropolymer precursor is one obtained by subjecting the above fluorovinyl ether derivative to polymerization, the $-SO_2X$ or $-COZ^1$ group to be hydrolyzed in the above-mentioned hydrolysis step is one derived from the fluorovinyl ether derivative represented by the above general formula (II).

In the fluorovinyl ether derivative, n in the above general formula (II) represents an integer of 0 to 3. Preferably, n is 0 or 1. In the above general formula (II), m represents an integer of 1 to 5. Preferably, m is 2.

In the above general formula (II), $Y^1$ represents a fluorine atom, a chlorine atom or a perfluoroalkyl group, and n atoms/groups of $Y^1$ may be the same or different. In the general formula (II), $Y^2$ represents a fluorine atom or a chlorine atom, and m atoms of $Y^2$ may be the same or different. The above perfluoroalkyl group is not particularly restricted but may be, for example, trifluoromethyl or pentafluoroethyl. In the above general formula (II), $Y^1$ is preferably a trifluoromethyl group, and $Y^2$ is preferably a fluorine atom.

As X in the above general formula (II), there may be mentioned the same ones as mentioned above. Among the halogen atoms, X representing a fluorine atom or chlorine atom, $Y^1$ representing a fluorine atom or chlorine atom, and $Y^2$ representing a fluorine atom or chlorine atom may be the same or different.

As for $Z^1$ in the above general formula (II), there may be mentioned the same species as mentioned hereinabove.

Preferred as the fluorovinyl ether derivative are those in which, in general formula (II), $Y^2$ is a trifluoromethyl group, $Y^2$ is a fluorine atom, n is 0 or 1, and m is 2.

The above fluoropolymer precursor is generally a copolymer of the above fluorovinyl ether derivative and a monomer(s) copolymerizable with the fluorovinyl ether derivative, and preferably is a binary or multinary copolymer obtained by polymerizing the above fluorovinyl ether derivative with a fluorine-containing ethylenic monomer. The fluorine-containing ethylenic monomer is not particularly restricted but may be any vinyl group-containing one. This is different from the above-mentioned fluorovinyl ether derivative.

As the fluorine-containing ethylenic monomer, there may be mentioned, for example, haloethylenic monomers represented by the following general formula:

$$CF_2=CF-R_f^1$$

(wherein $R_f^1$ represents a fluorine atom, a chlorine atom, $-R_f^2$ or $-OR_f^2$, and $R_f^2$ represents a straight or branched fluoroalkyl group having 1 to 9 carbon atoms, which may contain an ether oxygen atom or atoms), and hydrogen-containing fluoroethylenic monomers represented by the general formula:

$$CHY^3=CFY^4$$

(wherein $Y^3$ represents a hydrogen atom or a fluorine atom, $Y^4$ represents a hydrogen atom, a fluorine atom, a chlorine atom, $R_f^3$ or $-OR_f^3$; $R_f^3$ represents a straight or branched fluoroalkyl group having 1 to 9 carbon atoms, which may contain an ether oxygen atom or atoms).

Preferably, the fluorine-containing ethylenic monomer comprises at least one monomer selected from the group consisting of $CF_2=CF_2$, $CH_2=CF_2$, $CF_2=CFCl$, $CF_2=CFH$, $CH_2=CFH$, $CF_2=CFCF_3$, and fluorovinyl ethers represented by $CF_2=CF-O-R_f^4$ ($R_f^4$ representing a fluoroalkyl group having 1 to 9 carbon atoms or a fluoropolyether group having 1 to 9 carbon atoms). Preferably, $R_f^4$ in the fluorovinyl ethers is a perfluoroalkyl group having 1 to 3 carbon atoms.

The fluorine-containing ethylenic monomer is preferably a perhaloethylenic monomer, in particular a perfluoroethylenic monomer, more preferably $CF_2=CF_2$. The fluorine-containing ethylenic monomer may comprise one single species or two or more species.

In addition to the fluorine-containing ethylenic monomer, another copolymerizable monomer may further be added for providing the fluorocopolymer with various functional properties so long as the fundamental performance characteristics of the fluoropolymer are not deteriorated. The other copolymerizable monomer is not particularly restricted but may be adequately selected from among copolymerizable monomers to achieve the purpose of controlling the rate of polymerization, controlling the polymer composition, controlling the mechanical properties such as elasticity modulus, or introducing crosslinking sites, for instance. As examples, there may be mentioned, among others, monomers having two or more unsaturated bonds, for example perfluorodivinyl ether, and cyano group-containing monomers.

The above fluoropolymer precursor preferably has a fluorovinyl ether derivative unit content of 5 to 40 mole percent. If such content is lower than 5 mole percent, the fluoropolymer obtained therefrom, when used as an electrolyte, may show deteriorated performance characteristics. At content levels exceeding 40 mole percent, the mechanical strength of the films/membranes obtained using the fluoropolymer obtained may be insufficient in certain cases. In cases where, in the fluoropolymer solid composition of the present invention, the sulfonic acid group and/or carboxyl group concentration on the fluoropolymer particle surface is more than that in the fluoropolymer particle inside, the fluorovinyl ether derivative unit content on the fluoropolymer particle surface is required to be within the above range. A more preferred lower limit is 8 mole percent, and a more preferred upper limit is 35 mole percent.

The term "fluorovinyl ether derivative unit" as used herein means the part derived from the fluorovinyl ether derivative in the molecular structure of the fluoropolymer precursor. The "fluorovinyl ether derivative unit content" so referred to herein is the proportion of the number of moles of the fluorovinyl ether derivative from which the fluorovinyl ether derivative unit is derived to the number of moles of the monomers from which all the monomer units in the fluoropolymer precursor are derived. "All the monomer units" refers to the sum of the parts derived from all the monomer in the molecular structure of the fluoropolymer precursor. Therefore, meant by saying "the monomers from which all the monomer units are derived" is the total amount of the monomers which have become constituents of the fluoropolymer precursor. The fluorovinyl ether derivative unit content is the value obtained by infrared absorption spectrometry [IR] or fused-state NMR at 300° C.

The method for producing a fluoropolymer dispersion according to the present invention comprises the above-mentioned hydrolysis step and further the polymerization reaction step in which the polymerization reaction is carried out. The polymerization reaction is intended to obtain the fluoropolymer precursor. The polymerization reaction is preferably carried out in an aqueous reaction medium.

The above polymerization reaction is preferably carried out by emulsion polymerization. As for the method of emulsification, it may be the method using, for emulsification, one of those emulsifiers which are in general use in the conventional emulsion polymerization processes (hereinafter referred to as "existing emulsifiers"), the method using, for emulsification, an agent other than the existing emulsifiers but having emulsifying activity (hereinafter referred to as "emulsifying agent"), or the method using, for emulsification, both of an existing emulsifier and an emulsifying agent. The term "emulsion polymerization" as used herein means the polymerization which is carried out in the above-mentioned aqueous reaction medium using an existing emulsifier and/or an emulsifying agent.

The existing emulsifier is not particularly restricted but may be any of those generally used as emulsifiers in the conventional emulsion polymerization processes but, herein, it means an organic compound having surfactant activity and having no unsaturated bond. The term "surfactant activity" as used herein means that the compound is capable of forming micelles. The unsaturated bond in question is generally a carbon-carbon double bond. The organic compound having surfactant activity and having no unsaturated bond may be an anionic surfactant, cationic surfactant, nonionic surfactant or betaine type surfactant. From the emulsifying power viewpoint, however, it is preferably an anionic surfactant. The anionic surfactant is not particularly restricted but includes, among others, fluorine-containing emulsifiers such as fluorine-containing carboxylic acids represented by $X^4$ $(CF_2)_s$ COOH ($X^4$ representing a fluorine atom or a hydrogen atom and s representing an integer of 6 to 20) or $C_tF_{2t+1}O[CF(CF_3)CF_2O]_uCF(CF_3)COOH$ (t representing an integer of 1 to 5 and u representing an integer of 1 to 5) or salts of such fluorine-containing carboxylic acids; and fluorine-containing sulfonic acids represented by $C_vF_{2v+1}(CH_2)_wSO_3H$ (v representing an integer of 6 to 20 and w representing an integer of 0 to 4) or salt of such fluorine-containing sulfonic acids. As the salts, there may be mentioned, for example, alkali metal salts, ammonium salts, amine salts, quaternary ammonium salts, etc. As the anionic surfactant, there may specifically be mentioned ammonium perfluorooctanoate [$C_7H_{15}COONH_4$] and ammonium perfluorononanoate [$C_8H_{17}COONH_4$], among others, in view of their weathering resistance and water resistance.

As the emulsifying agent, there may be mentioned sulfonic acid salts, among others.

The emulsifying agent includes, among others, acid/acid salt fluorovinyl ether derivatives represented by the following general formula (VII):

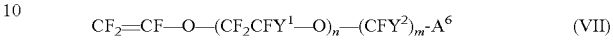

$$CF_2=CF-O-(CF_2CFY^1-O)_n-(CFY^2)_m-A^6 \quad (VII)$$

(wherein $Y^1$ represents a fluorine atom, a chlorine atom or a perfluoroalkyl group; n represents an integer of 0 to 3, and n atoms/groups of $Y^1$ may be the same or different; $Y^2$ represents a fluorine atom or a chlorine atom; m represents an integer of 1 to 5, and m atoms of $Y^2$ may be the same or different; $A^6$ represents $-SO_2X^3$, $-SO_2NR^{17}X^{18}$ and/or $-COOZ^3$; $X^3$ represents $-OM^5$ or $-OM^6_{1/2}$, $M^5$ represents an alkali metal or $NR^1R^2R^3R^4$, $R^1$, $R^2$, $R^3$ and $R^4$ are the same or different and each represents a hydrogen atom or an alkyl group having 1 to 4 carbon atoms, $M^6$ represents an alkaline earth metal; $R^{17}$ and $R^{18}$ are the same or different and each represents a hydrogen atom, an alkali metal, an alkyl group or a sulfonyl-containing group; $Z^3$ represents $M^7$ or $-M^8_{1/2}$, $M^7$ represents an alkali metal or $NR^5R^6R^7R^8$, $R^5$, $R^6$, $R^7$ and $R^8$ are the same or different and each represents a hydrogen atom or an alkyl group having 1 to 4 carbon atoms, and $M^8$ represents an alkaline earth metal). Preferred are acid salt fluorovinyl ether derivatives represented by the general formula (V):

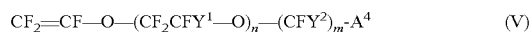

$$CF_2=CF-O-(CF_2CFY^1-O)_n-(CFY^2)_m-A^4 \quad (V)$$

(wherein $Y^1$, $Y^2$, n and m are as defined above, the n $Y^1$ atoms/groups may be the same or different and the m $Y^2$ atoms may be the same or different; $A^4$ represents $-SO_2X^3$ or $-COOZ^3$, and $X^3$ and $Z^3$ are as defined above). When such an acid/acid salt fluorovinyl ether derivative or such an acid salt fluorovinyl ether derivative as mentioned above is used, emulsification can be attained even if the aqueous reaction medium contains no existing emulsifier. Therefore, there is no need for removal of the existing emulsifier after emulsion polymerization, unlike in the conventional art. The above-mentioned acid/acid salt fluorovinyl ether derivative or acid salt fluorovinyl ether derivative shows emulsifying activity on the occasion of emulsion polymerization and, in addition, it is ethylenic and therefore can be added as a monomer in the polymerization reaction for polymerization thereof to constitute at least part of the molecular structure of the fluoropolymer precursor. The fluoropolymer precursor obtained by polymerizing the above acid/acid salt fluorovinyl ether derivative or acid salt fluorovinyl ether derivative can also have emulsifying activity.

In the above-mentioned hydrolysis step (B), the fluoromonomer (Qm) may have $-SO_2X^3$ as $A^6$ in the general formula (VII) among the above acid/acid salt fluorovinyl ether derivatives, namely as $A^4$ in the general formula (V) among the above acid salt fluorovinyl ether derivatives. The fluoromonomer (Qm) and the polymer chain comprising the fluoromonomer (Qm) have emulsifier activity and, therefore, the aqueous medium need not contain an existing emulsifier.

In this case, the fluoropolymer precursor (Q) is generally one obtained by carrying out the polymerization reaction in an aqueous reaction medium containing no existing emulsifier, as mentioned above.

The above emulsion polymerization may be carried out by using an existing emulsifier or by using an emulsifying agent without any existing emulsifier. The use of an emulsifying agent without any existing emulsifier is preferred since no emulsifier removal is required after the polymerization reaction and since, when the above-mentioned acid/acid salt fluorovinyl ether derivative or acid salt type fluorovinyl ether derivative is used, no emulsifier removal is required and, further, such derivative having emulsifying activity can efficiently be used as a monomer. Depending on the polymerization conditions in carrying out the above emulsion polymerization, the number of particles of the fluoropolymer precursor obtained may decrease, namely the particle size may increase, hence the load on the ultrafiltration membrane may increase in the low-molecular-weight substance elimination step mentioned above in some cases and, further, the films/membranes produced in the step of film/membrane formation may become heterogeneous in certain cases. In such cases, an existing emulsifier is preferably used.

For increasing the number of particles of the fluoropolymer precursor, it is possible to carry out the so-called "seed polymerization" which comprises carrying out the polymerization by using a large amount of an existing emulsifier or an emulsifying agent, diluting the dispersion obtained, and further continuing the polymerization.

The existing emulsifier and/or emulsifying agent to be used in the above emulsion polymerization is generally used in an amount of 0.01 to 10% by mass based on the aqueous reaction medium.

The polymerization reaction can be carried out in the conventional manner except that the above-mentioned emulsifying agent can be used as well.

The above polymerization reaction may be carried out using a polymerization initiator. The polymerization initiator is not particularly restricted but may be any of those generally used in the polymerization of fluoropolymers, for example organic peroxides, inorganic peroxides, and azo compounds. The use of ammonium persulfate [APS] is particularly preferred. The level of addition of the polymerization initiator is preferably 0.01 to 1% by mass relative to the total amount of all the monomers to be subjected to the polymerization reaction.

The aqueous reaction medium in the above polymerization reaction preferably has a pH of 4 to 7. At pH levels within the above range, the polymerization reaction can progress smoothly and the hydrolysis of $-SO_2X$ and/or $-COZ^1$, which the fluorovinyl ether derivative during polymerization reaction and/or the fluoropolymer precursor has, can be minimized.

When the acid salt fluorovinyl ether derivative of general formula (V) is used as an emulsifying agent, the fluoropolymer precursor obtained by the above polymerization reaction has the above-mentioned $-SO_2X^3$ and/or $-COOZ^4$. The $-SO_2X^3$ can be converted to the sulfonic acid group by acid treatment with an acid and, as for the method of such acid treatment, the same method as in the above-mentioned acid treatment step ($A_{acd}$) and acid treatment step ($B_{acd}$) can be used. It is thought that the above-mentioned $-COOZ^4$ can be converted to the carboxyl group by the same acid treatment as in the above acid treatment step ($A_{acd}$) and acid treatment step ($B_{acd}$).

In carrying out the method for producing a fluoropolymer dispersion according to the present invention, the above-mentioned polymerization reaction may be carried out in the manner of the so-called iodine transfer polymerization technique according to which the copolymerization is carried out in the presence of an iodine compound to give a block copolymer. When such iodine transfer polymerization is carried out, the films/membranes to be described later herein, which are obtained from the polymer, can show good mechanical strength characteristics even when the above-mentioned fluorovinyl ether derivative unit content is relatively low.

The iodine compound to be used in the above iodine transfer polymerization includes, among others, perfluoroalkylene diiodides such as 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane and 1,16-diiodoperfluorohexadecane, unsaturated bond-containing perfluoroalkenyl iodides such as $CF_2$=CFI and $CF_2$=CFOCF$_2$CF$_2$I, diiodomethane, and 1,2-diiodoethane. One of these species or a combination of two or more of them may be used. 1,4-Diiodoperfluorobutane is preferred, among others. The iodine compound may be used in an amount of 0.01 to 1% by mass relative to the total amount of all the monomers subjected to the polymerization reaction.

The method for producing an acid-derivative-type-group-containing fluorocopolymer according to the present invention comprises polymerizing a fluorovinyl ether derivative (Rm) represented by the following general formula (VI):

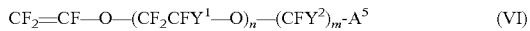

$$CF_2=CF-O-(CF_2CFY^1-O)_n-(CFY^2)_m-A^5 \quad \quad (VI)$$

(wherein $Y^1$ represents a fluorine atom, a chlorine atom or a perfluoroalkyl group; n represents an integer of 0 to 3, and n atoms/groups of $Y^1$ may be the same or different; $Y^2$ represents a fluorine atom or a chlorine atom; m represents an integer of 1 to 5, and m atoms of $Y^2$ may be the same or different; $A^5$ represents $-SO_2X^1$, $-COZ^1$ and/or $-CONR^{19}R^{20}$; $X^1$ represents a halogen atom, $Z^1$ represents an alkoxyl group having 1 to 4 carbon atoms, and $R^{19}$ and $R^{20}$ are the same or different and each represents a hydrogen atom, an alkali metal, an alkyl group or a sulfonyl-containing group) in an aqueous reaction system, said polymerization reaction being carried out using an acid/acid salt fluorovinyl ether derivative represented by the general formula (VII) given hereinabove. As the aqueous reaction medium, there may be mentioned those spices mentioned hereinabove.

The above polymerization reaction is preferably carried out by emulsion polymerization.

The method for producing an acid-derivative-type-group-containing fluorocopolymer according to the present invention may comprise the polymerization reaction using an existing emulsifier in combination. Since, however, the above-mentioned acid/acid salt fluorovinyl ether derivative functions as the above-mentioned emulsifying agent, emulsification is possible without using any existing emulsifier, as described hereinabove referring to the polymerization reaction using an emulsifying agent; further, the acid-derivative-type-group-containing fluorocopolymer obtained can have emulsifying activity. When no existing emulsifier is used, there is no need for existing emulsifier removal after polymerization and, therefore, the process can become economical and simplified, high-purity products can be obtained with ease, and there are not such inconveniences that will be caused when the existing emulsifier used remains at the case of forming the acid-derivative-type-group-containing fluorocopolymer into films/membranes. Such inconveniences include foaming or discoloration of films/membranes as caused by decomposition of the existing emulsifier, and corrosion of the drier inside wall.

In producing an acid-derivative-type-group-containing fluorocopolymer according to the present invention, the polymerization reaction is preferably carried out without using any existing emulsifier.

The method for producing an acid-derivative-type-group-containing fluorocopolymer according to the present invention produces an acid-derivative-type-group-containing fluorocopolymer according to the present invention, and the acid-derivative-type-group-containing fluorocopolymer may be in the form of a dispersion (first dispersion) obtained by the above-mentioned polymerization reaction and comprising an acid-derivative-type-group-containing fluorocopolymer particles as dispersed in an aqueous medium, or in the form of a second dispersion obtained by subjecting the first dispersion obtained by the polymerization reaction to such after-treatment as aggregation, flocculation and/or stabilizing treatment, or in the form of the acid-derivative-type-group-containing fluorocopolymer particles obtained by taking out from the above-mentioned first or second dispersion, followed by drying, or in the form of a powder which is an aggregate of such particles.

The acid-derivative-type-group-containing fluorocopolymer has $A^5$ in the above general formula (VI) as originating from the fluorovinyl ether derivative (Rm) and is common to the above-mentioned fluoropolymer precursor in that it can have $—SO_2X^1$ or $—COZ^1$ ($X^1$ and $Z^1$ being as defined above) as $A^5$. As for the chemical structure of the above-mentioned acid-derivative-type-group-containing fluorocopolymer, the fluoropolymer precursor is preferably obtained by subjecting a fluorovinyl ether derivative represented by the above general formula (II) to polymerization and the above general formula (II) is common in chemical structure to the above general formula (VI). Therefore, when the acid-derivative-type-group-containing fluorocopolymer is subjected to the same treatment as in the above-mentioned hydrolysis of the fluoropolymer precursor, the above-mentioned $—SO_2X^1$ and/or $—COZ^1$ can be hydrolyzed in an aqueous medium. In cases where $A^5$ which the above acid-derivative-type-group-containing fluorocopolymer has is $—CONR^{19}R^{20}$ ($R^{19}$ and $R^{20}$ being as defined above), $—CONR^{19}$ is generally hydrolyzed in an aqueous medium by the same treatment as in the above-mentioned hydrolysis step.

When the above-mentioned acid-derivative-type-group-containing fluorocopolymer, which can have a proton-conductive functional group obtained upon hydrolysis of $A^5$ in the above general formula (VI), said $A^5$ originating from the fluorovinyl ether derivative (Rm), is used in producing membranes having ion exchanging ability or proton transferring activity, for example electrolyte membranes, the copolymer can provide the membranes with improved performance characteristics.

The fluoropolymer dispersion of the present invention can also be obtained with ease by dispersing the fluoropolymer solid composition in a liquid medium, as described above. The method for dispersing the fluoropolymer solid composition of the present invention in a liquid medium is not particularly restricted but mention may be made of the method comprising using a stirrer such as a dissolver, the method using a medium mill such as a sand grinder, and the method based on ultrasonication, among others. From the simplicity viewpoint, in particular, the ultrasonication method is preferred.

The fluoropolymer dispersion of the present invention may be one resulting from substituting a certain liquid medium falling within the above-mentioned range of liquid media with another certain liquid medium in the conventional manner. For example, a fluoropolymer dispersion in a high-boiling liquid medium can be obtained by adding the relatively high-boiling liquid, such as N-methylpyrrolidone, to a fluoropolymer dispersion in a relatively low-boiling liquid medium, such as water, and removing the low-boiling liquid medium by heating for evaporation.

Such fluoropolymer dispersion obtainable by the above-mentioned method for producing a fluoropolymer dispersion also constitutes an aspect of the present invention.

The fluoropolymer dispersion of the present invention, if necessary after incorporation of an alcohol therein, can be suitably used in forming thin films/membranes by impregnating porous supports for film/membrane formation or by casting for film/membrane formation, as described later herein. The fluoropolymer dispersion of the present invention can also be used in thick film/membrane formation, if necessary after incorporation of polyethylene glycol or the like therein.

The alcohol to be incorporated according to need is not particularly restricted but may be any of those generally incorporated in polymer dispersions for thin film formation. Thus, there may be mentioned, for example, straight or branched alkanols having 1 to 5 carbon atoms, which may be substituted by a fluorine atom or atoms. Those alkanols having 1 to 3 carbon atoms are preferred. Such alkanols are not particularly restricted but include methanol, ethanol, propanol, isopropanol, tetrafluoropropanol, etc. As the tetrafluoropropanol, there may be mentioned 2,2,3,3-tetrafluoropropanol.

The dispersion composition for thin film formation of the present invention comprises the above-mentioned fluoropolymer dispersion and at least one alcohol selected from the group consisting of methanol, ethanol, propanol and tetrafluoropropanol. Preferred as the tetrafluoropropanol is 2,2,3,3-tetrafluoropropanol. The above-mentioned alcohol may be used singly or two or more of them may be used.

The level of addition of the above alcohol(s) is preferably 10 to 80% by volume relative to the fluoropolymer dispersion. By adding the alcohol(s) at the above addition level, it is possible to adjust the surface tension of the dispersion composition for thin film formation, so that when films/membranes are formed using the dispersion composition for thin film formation, as described later herein, uniform films/membranes can be obtained.

The dispersion composition for thin film formation may further contain one or more other components or ingredients other than the fluoropolymer dispersion and alcohol, unless the film-forming properties of the dispersion composition for thin film formation are impaired. As the other components/ingredients, there may be mentioned, among others, alcohols other than the above-defined alcohols, film-forming auxiliaries, and active substances to be mentioned later herein.

The above-mentioned fluoropolymer dispersion or dispersion composition for thin film formation can be judiciously used in forming films/membranes. The "films/membranes" include, within the meaning thereof, films/membranes including the so-called thin films/membranes and, further, films, sheets, and the like. The films/membranes may be those obtained by film/membrane formation by casting, impregnation, or coating, for instance. They do not include the substrates, porous supports or the like used in the step of film/membrane formation.

The film/membrane of the present invention is one obtained by film/membrane formation by casting using the above-mentioned fluoropolymer dispersion or dispersion composition for thin film formation. The phrase "film/membrane formation by casting" generally refers to the manufacture of thin films/membranes by applying the fluoropolymer dispersion or dispersion composition for thin film formation to the surface of a substrate such as a glass plate, drying the dispersion/composition at ordinary temperature and/or with heating, and peeling off the thus-formed film/membrane from the substrate surface, if necessary after immersing in water. When the above drying is carried out at ordinary temperature alone, the film/membrane obtained after application of the fluoropolymer dispersion or dispersion composition for thin film formation may readily soluble in water or the like in certain instances and, therefore, drying is preferably carried out at least with heating. The term "ordinary temperature" as used herein means a temperature of or in the vicinity of 30° C., and the "heating" generally refers to a temperature of 80 to 400° C. Preferably, the drying temperature is not lower than 200° C.

The film/membrane of the present invention is also one obtained by impregnating a porous support with the above-mentioned fluoropolymer dispersion or dispersion composition for thin film formation and then removing the liquid medium. Generally, the liquid medium can be removed by drying at ordinary temperature and/or with heating. The film/membrane obtained by impregnation with the fluoropolymer dispersion or dispersion composition for thin film formation, when dried only at ordinary temperature, may readily soluble in water or the like in certain instances and, therefore, the drying is preferably carried out at least with heating. The "drying with heating" following the impregnation can be carried out at a temperature not lower than the melting point of the fluoropolymer, for example at 200 to 350° C.

The above-mentioned porous support is not particularly restricted but may be an organic or inorganic material having a porous structure. Thus, there may be mentioned, among others, porous materials made of glass wool, a ceramic material, alumina, a porous polytetrafluoroethylene [PTFE] film, carbon, a nonwoven fabric or any of various polymers.

The films/membranes obtained by casting for film/membrane formation and the films/membranes formed on porous supports preferably have a film/membrane thickness of 5 to 50 µm. When the thickness is less than 5 µm, the films/membranes will be poor in mechanical strength characteristics and, when the thickness exceeds 50 µm, the films/membranes, when used in solid polymer electrolyte type fuels cells, for instance, will unfavorably cause deteriorations in performance characteristics of the fuel cells.

For obtaining thick films/membranes, it is preferable for the concentration of particles comprising the fluoropolymer in the fluoropolymer dispersion to be high, since, then, the number of repetitions of casting can be reduced and the volume shrinkage in the step of drying can be suppressed. Low concentrations are undesirable since, in particular when films/membranes with a thickness of scores of millimeters are to be obtained, it is necessary to repeat several times the step of casting of the fluoropolymer dispersion and the step of drying.

The active substance-immobilized material of the present invention comprises the fluoropolymer and an active substance and is one obtained by applying, to a substrate, a liquid composition comprising the active substance and the above-mentioned fluoropolymer dispersion or dispersion composition for thin film formation. Upon application of the liquid composition to a substrate, the fluoropolymer and active substance are immobilized on the substrate.

The above-mentioned active substance is not particularly restricted but may be judiciously selected, according to the intended use of the active substance-immobilized material, from among those substances capable of having activity in the active substance-immobilized material. For example, a catalyst can judiciously be used in certain instances.

The above-mentioned catalyst is not particularly restricted but may be any of those generally used as electrode catalysts. Thus, for example, mention may be made of metals comprising platinum, ruthenium, etc.; and organic metal complexes generally comprising one or more metals as central metals and comprising platinum or ruthenium as at least one of the central atoms. The metal comprising platinum or ruthenium or the like is preferably a platinum-containing metal, although it may be a ruthenium-containing metal such as simple substance ruthenium. The platinum-containing metal is not particularly restricted but includes, among others, simple substance platinum (platinum black); platinum-ruthenium alloys. Generally, the catalyst is used in the form supported on a carrier such as silica, alumina or carbon.

The above-mentioned liquid composition comprises at least the above-mentioned fluoropolymer dispersion or dispersion composition for thin film formation and the above-mentioned active substance, if necessary together with another component(s). As the other component, there may be mentioned, for example, film-forming auxiliaries.

The above-mentioned substrate is not particularly restricted but includes, among others, the above-mentioned porous supports, resin molded articles, and metal sheets/plates. Preferred are, for example, electrolyte membranes and porous carbon electrodes for fuel cells. The electrolyte membranes comprise preferably fluoropolymer, and it may comprise the above-mentioned fluoropolymer.

The "application of the liquid composition to a substrate" comprises applying the liquid composition to the substrate and, if necessary after drying, further heating the whole generally at a temperature not lower than the melting point of the fluoropolymer. So long as the fluoropolymer and active substance can be immobilized on the substrate, the heating conditions are not particularly restricted but, for example, several minutes, for example 2 to 30 minutes, of heating at 200 to 350° C. is preferred.

The electrolyte membrane of the present invention comprises the above-mentioned active substance-immobilized material. The electrolyte membrane may contain a substance(s) other than the active substance-immobilized material unless the properties of the active substance-immobilized material are deteriorated thereby.

The solid polymer electrolyte fuel cell of the present invention comprises the above-mentioned electrolyte membrane. The solid polymer electrolyte fuel cell is not particularly restricted so long as it comprises the above-mentioned electrolyte membrane. Generally, it may be one comprising those constituents which constitute the solid polymer electrolyte fuel cell, such as electrodes, gas, etc.

The above-mentioned dispersion composition for thin film formation, the film/membrane obtained by casting, the membrane formed on a porous support, the active substance-immobilized material, the electrolyte membrane and the solid polymer electrolyte fuel cell each is obtained from an acid/acid salt group-containing fluoropolymer, preferably a sulfonic acid group-containing fluoropolymer.

Best Modes For Carrying Out The Invention

The following examples illustrate the present invention in further detail. These examples are, however, by no means limitative of the scope of the present invention.

EXAMPLE 1

(1) A 300-ml stainless steel autoclave of the agitator type was charged with a solution of 2.4 g of $CF_2{=}CFOCF_2CF_2SO_3Na$ and 20 mg of ammonium persulfate [APS] in pure water and, after cooling to 0° C., the autoclave inside space was thoroughly deaerated and substituted with tetrafluoroethylene [TFE] gas and then evacuated. Then, 20 g of $CF_2{=}CFOCF_2CF_2SO_2F$ deaerated with $N_2$ gas was injected into the autoclave, hexafluoropropylene [HFP] gas was further injected under pressure until a pressure of 0.08 MPa and, finally, TFE gas was injected under pressure until 0.9 MPa, immediately followed by the start of temperature raising. The temperature was programmed so that it arrived at 60° C. in about 10 minutes, when the pressure was 1.2 MPa. Immediately thereafter, the pressure began to fall and dropped to 0.7 MPa after 1.5 hours. Thereafter, the polymerization was continued while maintaining the pressure at 0.7 to 0.9 MPa. After 4 hours, the polymerization was finished by temperature raising and pressure release. A fluoropolymer precursor composed of tetrafluoroethylene [TFE] and $CF_2\!=\!CFOCF_2CF_2SO_2F$ was obtained in the state of a colorless, transparent dispersion, and the unreacted portion of $CF_2\!=\!CFOCF_2CF_2SO_2F$ weighed about 4 g. The solid content of the fluoropolymer precursor in the dispersion was 16% by mass, and the $CF_2\!=\!CFOCF_2CF_2SO_2F$ unit content in the fluoropolymer precursor was 16 mole percent. The $CF_2\!=\!CFOCF_2CF_2SO_2F$ unit content values described herein each is the value obtained by subjecting each fluoropolymer precursor to coagulation with an acid and washing and then to infrared absorption spectroscopic measurement [IR] or fused-state NMR measurement at 300° C.

(2) The fluoropolymer precursor dispersion (50 ml) obtained as described above under (1) was two-fold diluted with pure water, the dilution was stirred in a 200-ml beaker, the temperature was raised to 55° C., and the —$SO_2F$ groups of the fluoropolymer precursor were hydrolyzed by adding dropwise a 10% (by mass) aqueous solution of potassium hydroxide while maintaining the pH at 10. After about 3 hours, no more decrease in pH was observed. However, the hydrolysis step was continued for further 2 hours and then finished. During this period, no fluoropolymer precipitation was perceived by the eye.

(3) The reaction mixture obtained as described above under (2) was treated for hydrolysis by adding 1 N hydrochloric acid, and the fluoropolymer was purified and concentrated by centrifugal ultrafiltration using Centriprep YM-10 centrifugal filter units (product of Amicon) with simultaneous removal of low-molecular-weight substances. The fluoropolymer dispersion obtained had a fluoropolymer concentration of 32% by mass and contained a fluoropolymer having stable —$SO_3K$ groups with a small proportion of —$SO_3Na$ groups.

(4) To the fluoropolymer dispersion obtained as described above under (3) was added a mixture of ethanol and isopropanol (1:1 by volume) in an amount half the volume of the dispersion to give a dispersion composition for thin film formation. The thus-obtained dispersion composition for thin film formation had a viscosity of about 0.08 Pa·s. The dispersion composition for thin film formation was applied onto a glass sheet and then dried at room temperature to give a colorless, transparent film. The film formed was heat-treated at 300° C. for 10 minutes for fixation. The whole was then immersed in pure water, and the thin film was peeled off from the glass sheet. The thin film obtained had a thickness of 5-10 μm. The viscosity given above is the value obtained by carrying out the measurement at 25° C. using a type B viscometer.

EXAMPLE 2

A fluoropolymer precursor was obtained in the state of a dispersion in the same manner as in (1) of Example 1 except that an amount of 2% by mass, relative water, of ammonium perfluorooctanoate [$C_7F_{15}COONH_4$] was used as the emulsifier in lieu of $CF_2\!=\!CFOCF_2CF_2SO_3Na$ and that the charging of hexafluoropropylene [HFP] gas under pressure was omitted. The dispersion obtained was colorless and transparent, the solid content of the fluoropolymer precursor in the dispersion was 18% by mass, and the $CF_2\!=\!CFOCF_2CF_2SO_2F$ unit content in the fluoropolymer precursor was 16.5 mole percent.

The fluoropolymer precursor dispersion obtained was treated in the same manner as described above under (2), (3) and (4) in Example 1. The —$SO_2F$ groups in the fluoropolymer precursor could be converted to —$SO_3K$ groups, and coating films could be formed as well.

EXAMPLE 3

A fluoropolymer precursor was obtained in the state of a dispersion in the same manner as in (1) of Example 1 except that $CF_2\!=\!CFOCF_2CF_2SO_3Na$ was not used. A certain extent of fluoropolymer precursor coagulated in the dispersion obtained, and the fluoropolymer precursor particles were large in size, hence the dispersion was opaque.

The dispersion obtained was subjected to alkali hydrolysis in the same manner as in (2) of Example 1. Although the fluoropolymer particles coagulated in the early reaction stage, the hydrolysis reaction could be brought to completion.

The reaction mixture after the above hydrolysis was ultrafiltered by the same centrifugal ultrafiltration method as described above under (3) in Example 1. Although the fluoropolymer sedimented because of the large sizes of particles thereof, the fluoropolymer, when stirred in pure water, could be dispersed again.

A dispersion composition for thin film formation comprising the fluoropolymer dispersion after purification was prepared in the same manner as mentioned above under (4) in Example 1 and applied to a glass sheet, followed by drying at room temperature. The resulting film was milk-white because of its being not homogeneous. When heated at 300° C., however, the film became colorless and transparent. It was thus possible to obtain thin films/membranes.

EXAMPLE 4

A transparent dispersion was obtained in the same manner as in (1) of Example 1 except that 100 mg of 1,4-diiodoperfluorobutane [$I(CF_2)_4I$] was added together with $CF_2\!=\!CFOCF_2CF_2SO_2F$. Then, the residual $CF_2\!=\!CFOCF_2CF_2SO_2F$ was removed by 30 minutes of degassing treatment under reduced pressure at 40° C. with purging with $N_2$ gas and, then, $CF_2\!=\!CFCF_3$ gas was charged under pressure until 0.6 MPa and, further, $CF_2\!=\!CF_2$ gas was charged under pressure until 1 MPa. Upon raising the temperature to 60° C., pressure drop immediately began. The polymerization was continued for 1.5 hours while feeding $CF_2\!=\!CF_2$ gas to maintain the pressure at 0.9 to 1.0 MPa. Thereafter, the polymerization reaction was terminated by pressure release, whereby a colorless and transparent fluoropolymer precursor dispersion was obtained.

The fluoropolymer precursor dispersion obtained, when treated in the same manner as described above under (2), (3) and (4) in Example 1, could give the corresponding fluoropolymer dispersion and coating films.

As the above results indicate, the fluoropolymer dispersion of Example 3 as produced by using the fluoropolymer precursor obtained by the polymerization reaction in the aqueous reaction medium containing neither the monomer having emulsifying activity nor the emulsifier could be obtained in the state of a dispersion and could be formed into films/membranes. The fluoropolymer dispersion of Example 1 or 2 as produced by using the fluoropolymer precursor obtained by the polymerization reaction in the aqueous reaction medium containing the monomer having emulsifying activity or the emulsifier showed better dispersibility and film-forming ability, among others. The fluoropolymer dispersion of Example 4 as produced by using the fluoropolymer precursor obtained by using the iodine transfer polymerization technique had no dispersibility, film-forming ability or like problems.

EXAMPLE 5

(1) A 3,000-ml stainless steel autoclave of the agitator type was charged with 300 g of a 10% aqueous solution of $C_7F_{15}COONH_4$ and 1,170 g of pure water, followed by thorough evacuation and nitrogen substitution. After thorough evacuation of the autoclave, tetrafluoroethylene [TFE] was injected into the autoclave until a gage pressure of 0.2 MPa and the temperature was raised to 50° C. Then, 100 g of $CF_2=CFOCF_2CF_2SO_2F$ was charged and TFE gas was introduced to increase the pressure to a gage pressure of 0.7 MPa. A solution of 0.5 g of ammonium persulfate [APS] in 60 g of pure water was then injected into the autoclave to initiate the polymerization reaction.

For filling up that portion of TFE consumed by polymerization, TFE was continuously fed to maintain the autoclave inside pressure at 0.7 MPa. Further, $CF_2=CFOCF_2CF_2SO_2F$ was continuously fed in an amount corresponding to 53% by mass of the TFE fed to continue the polymerization reaction.

At the time when the TFE fed amounted to 522 g, the pressure in the autoclave was released to terminate the polymerization reaction. The reaction mixture was then cooled to room temperature to give 2,450 g of a slightly turbid aqueous dispersion with a fluoropolymer precursor content of about 33% by mass.

A portion of the above aqueous dispersion was taken and coagulated with nitric acid, and the coagulate was washed with water and dried and subjected to fused-state NMR measurement. The fluorovinyl ether derivative unit content in the fluoropolymer precursor was 19 mole percent.

(2) A 50-ml portion of the fluoropolymer precursor dispersion obtained in the above step (1) was 5-fold diluted with pure water. The dilution was stirred in a 500-ml beaker, the temperature was raised to 55° C., and the —SO$_2$F groups which the fluoropolymer precursor had were hydrolyzed while maintaining the pH at 10 or above by adding dropwise a 10% (by mass) aqueous solution of sodium hydroxide. After about 3 hours, no more decrease in pH was observed. However, the hydrolysis was further continued for 2 hours and then terminated. Fluoropolymer precipitation was not noticed by the eye.

(3) Acid hydrolysis was effected by adding 1 N hydrochloric acid to the reaction mixture obtained in the above step (2), and the fluoropolymer was purified and concentrated and low-molecular-weight substances were removed simultaneously by centrifugal ultrafiltration using Centriprep YM-10 centrifugal filter units (product of Amicon). The fluoropolymer dispersion obtained had a fluoropolymer concentration of 43% by mass and contained the corresponding fluoropolymer having stable —SO$_3$K groups.

The fluoropolymer dispersion was 100-fold diluted with pure water, and a sample for particle shape measurement was prepared by dropping the dilution onto an aluminum sheet, followed by drying at 60° C. The sample was subjected to atomic force microscopy [AFM], 20 particles in the picture obtained were extracted at random, and the aspect ratio and average particle diameter thereof were determined and found to be 1.0 and 100 nm, respectively.

(4) To the fluoropolymer dispersion obtained as described above under (3) was added a mixture of ethanol and isopropanol (1:1 by volume) in an amount half the volume of the dispersion to give a dispersion composition for thin film formation. The thus-obtained dispersion composition for thin film formation had a viscosity of about 0.08 Pa·s. The dispersion composition for thin film formation was applied onto a glass sheet and then dried at room temperature to give a colorless, transparent film. The film formed was heat-treated at 300° C. for 10 minutes for fixation. The whole was then immersed in pure water, and the thin film was peeled off from the glass sheet. The thin film obtained had a thickness of 12 to 17 µm. The viscosity given above is the value obtained by carrying out the measurement at 25° C. using a type B viscometer.

(5) The fluoropolymer dispersion obtained in the above step (3) was evaporated to dryness using a rotary evaporator to give a fluoropolymer solid composition. Observation of the surface of the fluoropolymer solid composition under a scanning electron microscope [SEM] gave the same results as described above under (3).

(6) A 5-g portion of the fluoropolymer solid composition obtained in the above step (5) was placed in a 200-ml beaker, 95 g of NMP was added, and the mixture was sonicated for 15 minutes with occasional shaking. A slightly turbid fluoropolymer dispersion was obtained.

EXAMPLE 6

(1) A 3,000-ml stainless steel autoclave of the agitator type was charged with 600 g of a 10% aqueous solution of $C_7F_{15}COONH_4$ and 870 g of pure water, followed by thorough nitrogen substitution. The autoclave was evacuated sufficiently and, then, TFE gas was charged until a gage pressure of 0.2 MPa, and the temperature was raised to 50° C. Thereafter, 20 g of $CF_2=CFOCF_2CF_2SO_2F$ was injected, and the gage pressure was raised to 0.7 MPa by introducing TFE gas. The polymerization was then initiated by injecting an aqueous solution of 0.5 g of ammonium persulfate [APS] in 60 g of pure water.

For filling up that portion of TFE consumed by polymerization, PFE was continuously fed to maintain the autoclave inside pressure at 0.7 MPa. Further, $CF_2=CFOCF_2CF_2SO_2F$ was continuously fed in an amount corresponding to 30% by mass of the TFE fed to continue the polymerization reaction.

At the time when the TFE fed amounted to 400 g, a portion of the fluoropolymer precursor dispersion was collected as a sample. Then, 120 g of $CF_2=CFOCF_2CF_2SO_2F$ was charged under pressure and the polymerization was further continued. Since the pressure rapidly decreased at that point of time and, therefore, TFE was fed in an increased amount but this was not immediately consumed by polymerization. After pressure recovery, the polymerization was continued while continuously feeding $CF_2=CFOCF_2CF_2SO_2F$ in an amount of 60% by mass of the TFE consumed by polymerization.

At the time when the TFE fed amounted to 200 g, the pressure in the autoclave was released to terminate the polymerization reaction. The reaction mixture was then cooled to room temperature to give 2,470 g of a slightly turbid aqueous dispersion with a fluoropolymer precursor content of about 33% by mass.

A dried fluoropolymer precursor was obtained from the above aqueous dispersion in the same manner as in Example 5. As a result of fused-state NMR measurement, the $CF_2=CFOCF_2CF_2SO_2F$ unit content in the fluoropolymer precursor was found to be 10 mole percent and the $CF_2$=$CFOCF_2CF_2SO_2F$ unit content in the above aqueous dispersion to be 13 mole percent.

The desired fluoropolymer dispersion was obtained through the same hydrolysis step and purification/concentration step as in Example 5.

The polymer particles in the fluoropolymer dispersion obtained had an aspect ratio of 1.1 and an average particle diameter of 60 nm.

INDUSTRIAL APPLICABILITY

The method for producing a fluoropolymer dispersion according to the present invention, which has the above-described constitution, can produce, in an aqueous system, fluoropolymer dispersions each resulting from dispersion of an acid/acid salt group-containing fluoropolymer through the polymerization reaction step and hydrolysis step. The fluoropolymer dispersions obtained and the fluoropolymer solid compositions derived therefrom can be adequately used in producing electrolyte membranes in solid polymer electrolyte fuel cells, in particular.

The invention claimed is:

1. A method for producing a fluoropolymer dispersion to give the fluoropolymer dispersion where a fine particle comprising a fluoropolymer is dispersed in an aqueous dispersion medium, the fluoropolymer having a sulfonic acid group, the method comprising:

a polymerization reaction step of emulsion polymerizing a fluorovinyl ether derivative and a fluorine-containing ethylenic monomer to give an aqueous dispersion of a fluoropolymer precursor, wherein the fluorovinyl ether derivative being represented by the following general formula (II):

$$CF_2=CF-O-(CF_2CFY^1-O)_n-(CFY^2)_m-A^1 \quad (II)$$

wherein $Y^1$ represents a fluorine atom, a chlorine atom or a perfluoroalkyl group; n represents an integer of 0 to 3, and n atoms/groups of $Y^1$ may be the same or different; $Y^2$ represents a fluorine atom or a chlorine atom; m represents an integer of 1 to 5, and m atoms of $Y^2$ may be the same or different; $A^1$ represents —$SO_2X^1$; $X^1$ represents a halogen atom, the fluoropolymer precursor having a fluorovinyl ether derivative unit content of 5 to 40 mole percent;

a hydrolysis step of hydrolyzing in the aqueous dispersion —$SO_2X^1$, wherein $X^1$ represents a halogen atom which the fluoropolymer precursor has thereby to give the fluoropolymer by adding dropwise an alkali to the aqueous dispersion with 5 to 15% by mass relative to the aqueous medium of the fluoropolymer precursor, wherein the fluoropolymer dispersion is produced without drying the fluoropolymer precursor and the fluoropolymer.

2. The method for producing a fluoropolymer dispersion according to claim 1, wherein the sulfonic acid group is bound to a fluoroether side chain represented by the following general formula (I):

$$-O-(CF_2CFY^1-O)_n-(CFY^2)_m- \quad (I)$$

wherein $Y^1$ represents a fluorine atom, a chlorine atom or a perfluoroalkyl group; n represents an integer of 0 to 3, and n atoms/groups of $Y^1$ may be the same or different; $Y^2$ represents a fluorine atom or a chlorine atom; m represents an integer of 1 to 5, and m atoms of $Y^2$ may be the same or different, and wherein the fluoroether side chain is bound, in the manner of ether bonding, to a carbon atom constituting a perfluoroethylene unit in a main chain of the fluoropolymer.

3. The method for producing a fluoropolymer dispersion according to claim 1, wherein $Y^1$ is a trifluoromethyl group, $Y^2$ is a fluorine atom, n is 0 or 1 and m is 2.

4. The method for producing a fluoropolymer dispersion according to claim 1, wherein the polymerization reaction is carried out by iodine transfer polymerization.

5. The method for producing a fluoropolymer dispersion according to claim 1, wherein the hydrolysis step comprises an alkali treatment step and thereafter, a subsequent step of neutralization treatment with an acid.

6. The method for producing a fluoropolymer dispersion according to claim 1, the polymerization reaction step being carried out with an acid/acid salt fluorovinyl ether derivative represented by the following general formula (VII):

$$CF_2=CF-O-(CF_2CFY^1-O)_n-(CFY^2)_m-A^6 \quad (VII)$$

wherein $Y^1$ represents a fluorine atom, a chlorine atom or a perfluoroalkyl group; n represents an integer of 0 to 3, and n atomsgroups of $Y^1$ may be the same or different; $Y^2$ represents a fluorine atom or a chlorine atom; m represents an integer of 1 to 5, and m atoms of $Y^2$ may be the same or different; $A^6$ represents —$SO_3X^3$ and/or —$SO_2NR^{17}R^{18}$; $X^3$ represents —$OM^5$ or —$OM^6_{1/2}$; $M^5$ represents an alkali metal or $NR^1R^2R^3R^4$ in which $R^1$, $R^2$, $R^3$ and $R^4$ are the same or different and each represents a hydrogen atom or an alkyl group having 1 to 4 carbon atoms; $M^6$ represents an alkaline earth metal; $R^{17}$ and $R^{18}$ are the same or different and each represents a hydrogen atom, an alkali metal, an alkyl group or a sulfonyl-containing group.

7. The method for producing a fluoropolymer dispersion according to claim 1, wherein the method further comprises a step of removing a low-molecular-weight substance following the alkali treatment step, and the low-molecular-weight substance being a residual monomer remaining in the polymerization reaction step, a polymerization initiator residue, andor a substance formed upon treatment of the fluoropolymer precursor with an alkali.

8. The method for producing a fluoropolymer dispersion according to claim 7, wherein the step of removing a low-molecular-weight substance is carried out by ultrafiltration technique.

9. The method for producing a fluoropolymer dispersion according to claim 1, the fine particle comprising the fluoropolymer containing at least 25% by mass thereof a spherical fluoropolymer fine particle, and the spherical fluoropolymer fine particle being substantially spherical.

10. The method for producing a fluoropolymer dispersion according to claim 9, wherein the spherical fluoropolymer fine particle has an average particle diameter of 10 to 300 nm.

* * * * *